United States Patent
Lee et al.

(10) Patent No.: US 11,490,284 B2
(45) Date of Patent: Nov. 1, 2022

(54) METHOD AND DEVICE FOR REPORTING MEASUREMENT RESULT FOR LOCATION DETERMINATION IN WIRELESS COMMUNICATION SYSTEM

(71) Applicant: LG ELECTRONICS INC., Seoul (KR)

(72) Inventors: Sangrim Lee, Seoul (KR); Woonghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/254,842

(22) PCT Filed: Jun. 14, 2019

(86) PCT No.: PCT/KR2019/007192
§ 371 (c)(1),
(2) Date: Dec. 21, 2020

(87) PCT Pub. No.: WO2019/245234
PCT Pub. Date: Dec. 26, 2019

(65) Prior Publication Data
US 2021/0266773 A1 Aug. 26, 2021

(30) Foreign Application Priority Data

Jun. 22, 2018 (KR) .................. 10-2018-0071733

(51) Int. Cl.
*H04W 24/10* (2009.01)
*H04W 4/029* (2018.01)
(Continued)

(52) U.S. Cl.
CPC .............. *H04W 24/10* (2013.01); *G01S 5/10* (2013.01); *H04L 5/0048* (2013.01); *H04W 4/023* (2013.01); *H04W 4/029* (2018.02)

(58) Field of Classification Search
CPC ..... H04W 24/10; H04W 4/029; H04W 4/023; H04W 64/00; G01S 5/10; G01S 5/02; H04L 5/0048
See application file for complete search history.

(56) References Cited

U.S. PATENT DOCUMENTS

| 2015/0382318 A1 | 12/2015 | Kim et al. |
| 2017/0108579 A1 | 4/2017 | Irvine et al. |

(Continued)

FOREIGN PATENT DOCUMENTS

| KR | 1020170030773 | 3/2017 |
| WO | 2018029298 | 2/2018 |
| WO | 2018069208 | 4/2018 |

OTHER PUBLICATIONS

PCT International Application No. PCT/KR2019/007192, International Search Report dated Sep. 16, 2019, 3 pages.

*Primary Examiner* — Kabir A Timory
(74) *Attorney, Agent, or Firm* — Lee Hong Degerman Kang Waimey

(57) ABSTRACT

A method for reporting, by a terminal, a measurement result for location determination according to an embodiment of the present disclosure comprises the steps of: determining whether a channel characteristic between the terminal and each base station included in a plurality of base stations configured for location determination of the terminal corresponds to a visible ray (line of sight: LoS); calculating a reference signal time difference (RSTD) by configuring, as a reference cell, one of the base stations, the channel characteristics of which correspond to a visible ray (LoS); and reporting a measurement result including the RSTD.

10 Claims, 23 Drawing Sheets

(51) Int. Cl.
   *G01S 5/10*      (2006.01)
   *H04L 5/00*      (2006.01)
   *H04W 4/02*      (2018.01)

(56) References Cited

U.S. PATENT DOCUMENTS

2018/0069606 A1* 3/2018 Jung .................... H04W 48/20
2019/0373575 A1* 12/2019 Kurras ................. G01S 5/0278

* cited by examiner

FIG. 11
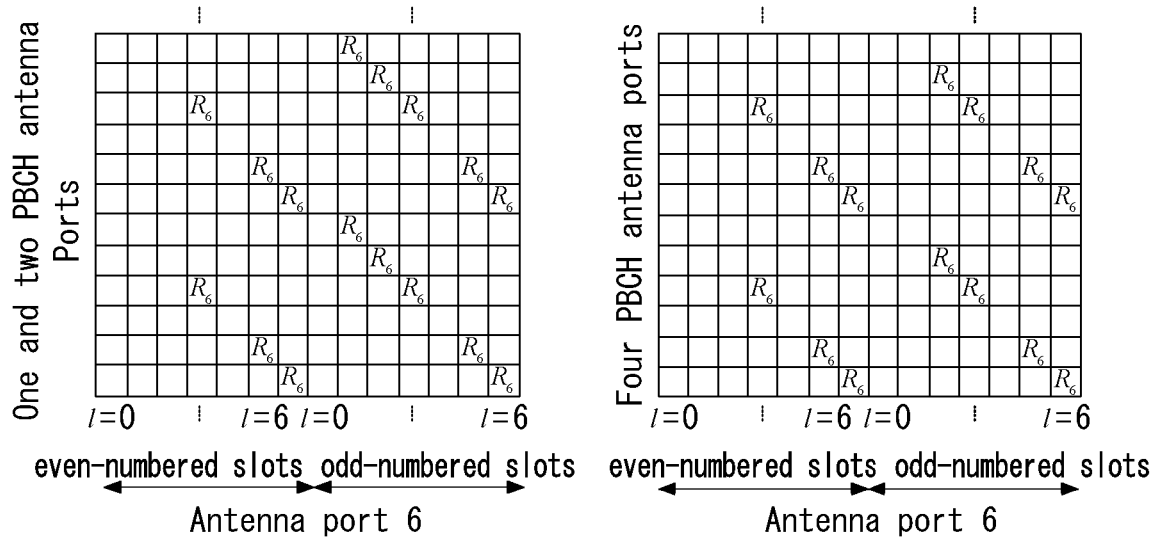
(a)
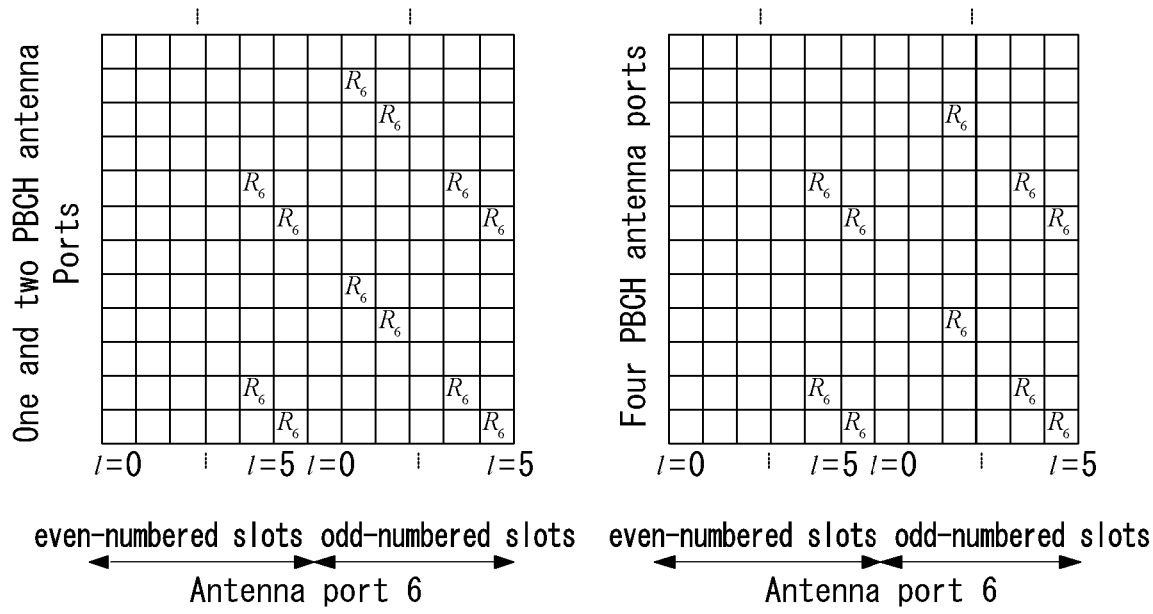
(b)

FIG. 13
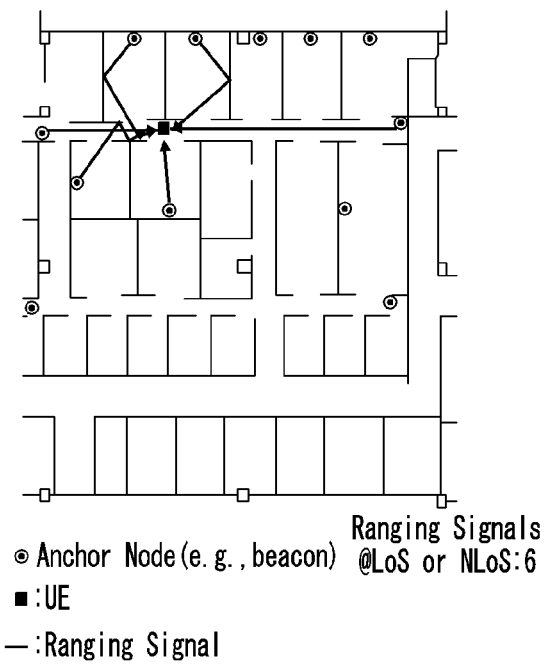
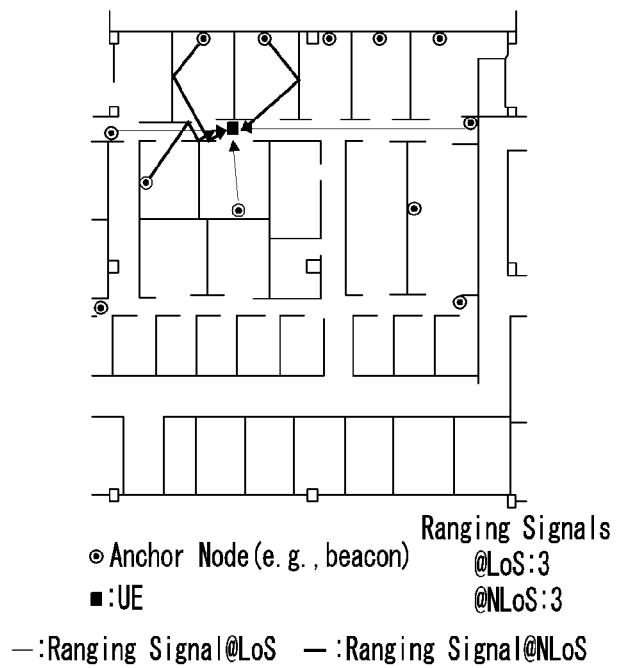
(a)  (b)

METHOD AND DEVICE FOR REPORTING MEASUREMENT RESULT FOR LOCATION DETERMINATION IN WIRELESS COMMUNICATION SYSTEM

CROSS-REFERENCE TO RELATED APPLICATIONS

This application is the National Stage filing under 35 U.S.C. 371 of International Application No. PCT/KR2019/007192, filed on Jun. 14, 2019, which claims the benefit of earlier filing date and right of priority to Korean Patent Application No. 10-2018-0071733, filed on Jun. 22, 2018, the contents of which are all incorporated by reference herein in their entirety.

TECHNICAL FIELD

The present disclosure relates to a measurement result report method and device for a location determination in a wireless communication system.

BACKGROUND ART

Mobile communication systems have been developed to provide voice services, while ensuring the activities of users. However, coverage of the mobile communication systems has extended up to data services, as well as voice service. Today, an explosive increase in traffic has caused the shortage of resources. There is a need for an advanced mobile communication system because users want relatively high speed services.

Requirements for a next-generation mobile communication system include the accommodation of explosive data traffic, a significant increase in the transfer rate per user, the accommodation of a greatly increased number of connection devices, very low end-to-end latency, and high energy efficiency. To this end, various technologies, such as dual connectivity, massive multiple input multiple output (MIMO), in-band full duplex, non-orthogonal multiple access (NOMA), super wideband, and device networking, are researched.

DISCLOSURE

Technical Problem

An object of the present disclosure is to provide a method and apparatus for reporting a measurement result for a location determination, which can improve performance for location measurement in a situation including multiple paths.

Furthermore, an object of the present disclosure is to calculate a reference signal time difference (RSTD) by considering a channel characteristic with a base station.

Furthermore, an object of the present disclosure is to receive a PRS from only a base station which can contribute to the improvement of the accuracy of a location determination.

Furthermore, an object of the present disclosure is to more efficiently receive the PRS of a base station which can contribute to the improvement of the accuracy of a location determination.

Technical objects to be achieved in the present disclosure are not limited to the aforementioned technical objects, and other technical objects not described above may be evidently understood by a person having ordinary skill in the art to which the present disclosure pertains from the following description.

Technical Solution

A method of reporting, by a terminal, a measurement result for a location determination according to an embodiment of the present disclosure includes determining whether a channel characteristic between each base station included in a plurality of base stations for the location determination of the terminal and the terminal is a line of sight (LoS), configuring, as a reference cell, any one base station among base stations whose channel characteristic is the LoS and calculating a reference signal time difference (RSTD), and reporting the measurement result including the RSTD.

In determining whether the channel characteristic is the LoS, the channel characteristic is determined as the LoS or a non-line of sight (NLoS) using LoS-likelihood calculated based on distance information between the terminal and the each base station.

The LoS-likelihood is calculated using a rank of an Euclidean distance matrix (EDM) configured based on the distance information.

In calculating the RSTD, the terminal selects, as the reference cell, a base station having the LoS-likelihood closest to a preset value among the base stations whose channel characteristic is the LoS.

The measurement result includes at least one piece of information among pieces of information related to the identity of the reference cell, LoS-likelihood of the reference cell, the identity of each of the base stations whose channel characteristic is the LoS, and LoS-likelihood of each of corresponding base stations.

Calculating the RSTD includes transmitting, to the plurality of base stations, a signal related to a positioning reference signal request (PRS request), and calculating the RSTD using a PRS received based on a signal related to the PRS request. The signal related to the PRS request includes muting information according to the channel characteristic.

The signal related to the PRS request includes information on base stations selected based on the channel characteristic, among the plurality of base stations. The muting information is information indicative of muting for remaining base stations except the selected base stations among the plurality of base stations.

The selected base stations are a preset number of base stations selected in a sequence in which a value of the LoS-likelihood is close to a preset value among the plurality of base stations.

Calculating the RSTD using the PRS received based on the signal related to the PRS request includes calculating the RSTD using PRSs of the selected base stations. The PRSs of the selected base stations are mapped to a time-frequency resource region assigned for a PRS of one base station.

Calculating the RSTD using the PRS received based on the signal related to the PRS request includes receiving PRS grouping information from any one base station among the plurality of base stations, and receiving the PRSs of the selected base stations using the PRS grouping information. The PRS grouping information includes information indicative of a resource element to which the PRS of each base station included in the selected base stations has been mapped.

A terminal reporting a measurement result for a location determination according to another embodiment of the present disclosure includes a transmitter transmitting a radio signal, a receiver receiving a radio signal, and a processor controlling the transmitter and the receiver. The processor is configured to determine whether a channel characteristic between each base station included in a plurality of base stations configured for the location determination of the terminal and the terminal is a line of sight (LoS), configure, as a reference cell, any one base station among base stations whose channel characteristic is the LoS and calculate a reference signal time difference (RSTD), and control the transceiver to report the measurement result including the RSTD.

The processor is configured to configure an Euclidean distance matrix (EDM) based on distance information between the terminal and the each base station and calculate LoS-likelihood using the EDM and to determine the channel characteristic as the LoS or a non-line of sight (NLoS) using the LoS-likelihood.

The processor is configured to transmit, to the plurality of base stations, a signal related to a positioning reference signal request (PRS request) and to calculate the RSTD using a received PRS based on a signal related to the PRS request. The signal related to the PRS request includes muting information according to the channel characteristic.

The signal related to the PRS request includes information on base stations selected based on the channel characteristic, among the plurality of base stations. The muting information is information indicative of muting for remaining base stations except the selected base stations among the plurality of base stations.

A device reporting a measurement result for a location determination according to another aspect of the present disclosure includes a memory and a processor coupled to the memory. The processor is configured to determine whether a channel characteristic between each base station included in a plurality of base stations for the location determination of the terminal and the terminal is a line of sight (LoS), configure, as a reference cell, any one base station among base stations whose channel characteristic is the LoS and calculate a reference signal time difference (RSTD), and control to report the measurement result including the RSTD.

Advantageous Effects

The present disclosure determines whether a channel characteristic between a plurality of base stations configured for location measurement of a UE and the UE is a line of sight (LoS) or a non-line of sight (NLoS), selects, as a reference cell, a base station whose channel characteristic is the LoS among the plurality of base stations, and calculates an RSTD. Accordingly, the accuracy of location measurement is enhanced in a situation including multiple paths.

Furthermore, the present disclosure can further improve the accuracy of location measurement because an RSTD is calculated using the positioning reference signals (PRSs) of base stations selected based on theirs channel characteristic.

Furthermore, the present disclosure includes muting information based on a channel characteristic in transmitting a PRS request signal, receives the PRS of a base station whose channel characteristic is the LoS among a plurality of base stations, and can block the PRSs of base stations whose channel characteristics are not LoSs. Accordingly, a gain in the reception of a PRS can be increased.

Furthermore, according to the present disclosure, the PRSs of base stations selected based on channel characteristics are mapped to a time-frequency resource assigned for one PRS. Information indicative of a resource element to which the PRS of each base station has been mapped can be received using PRS grouping information. Accordingly, a limited resource configured for PRS transmission can be more efficiently used.

Effects which may be obtained in the present disclosure are not limited to the aforementioned effects, and other technical effects not described above may be evidently understood by a person having ordinary skill in the art to which the present disclosure pertains from the following description.

DESCRIPTION OF DRAWINGS

FIG. 11 is a diagram illustrating patterns in which PRSs are assigned to resource elements.

FIG. 13 is a diagram for describing location measurement based on a determination of a channel characteristic in a situation including multiple paths.

MODE FOR INVENTION

Figure 1:
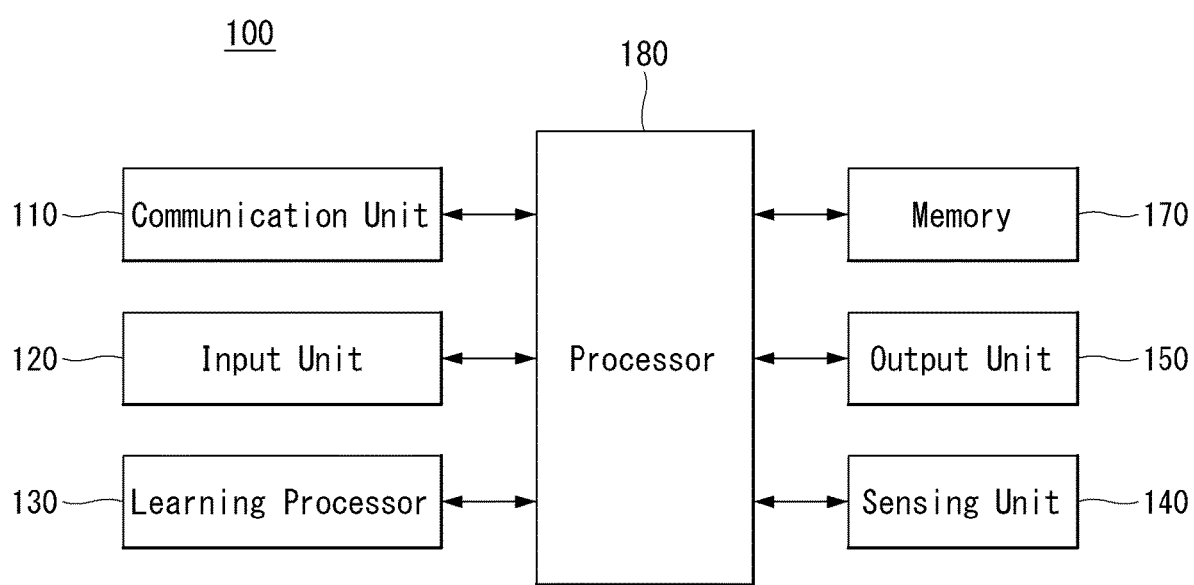
FIG. 1 illustrates an AI device 100 according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A/NR is primarily described for clear description, but technical features of the present disclosure are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions.

The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying embodiments to meet the above-described requirements of 5G.

The following describes in detail technical fields to which the present disclosure described below is applicable.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
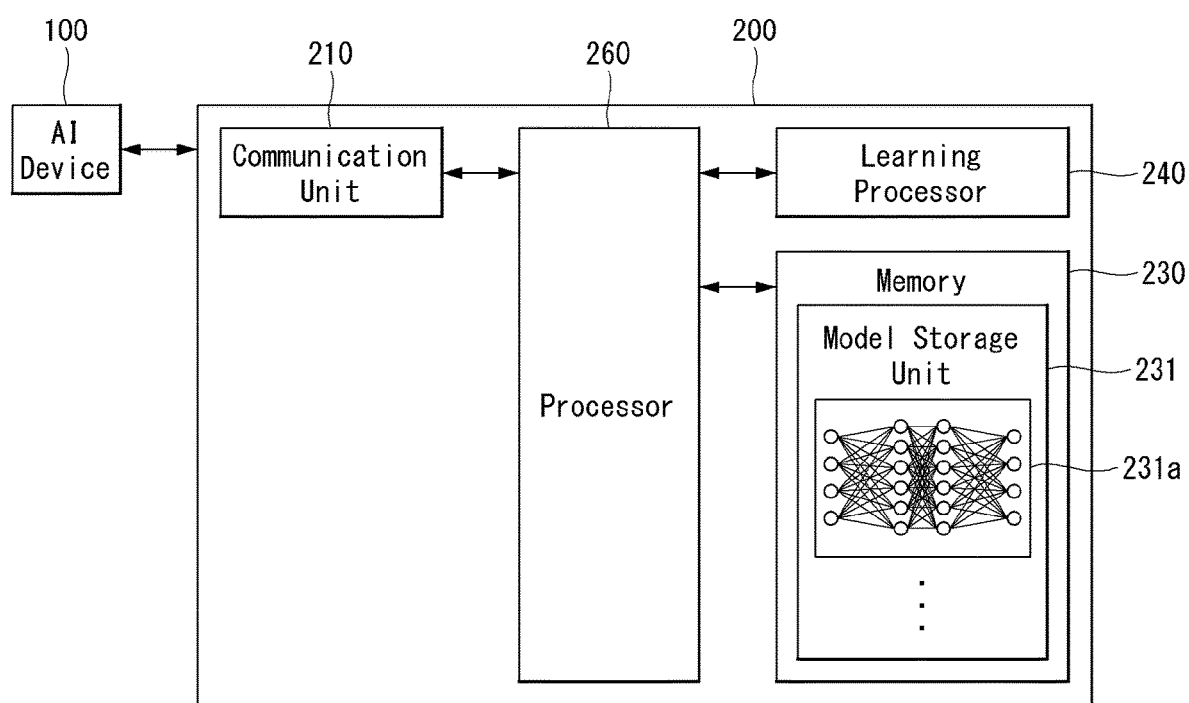
FIG. 2 illustrates an AI server 200 according to an embodiment of the present disclosure.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
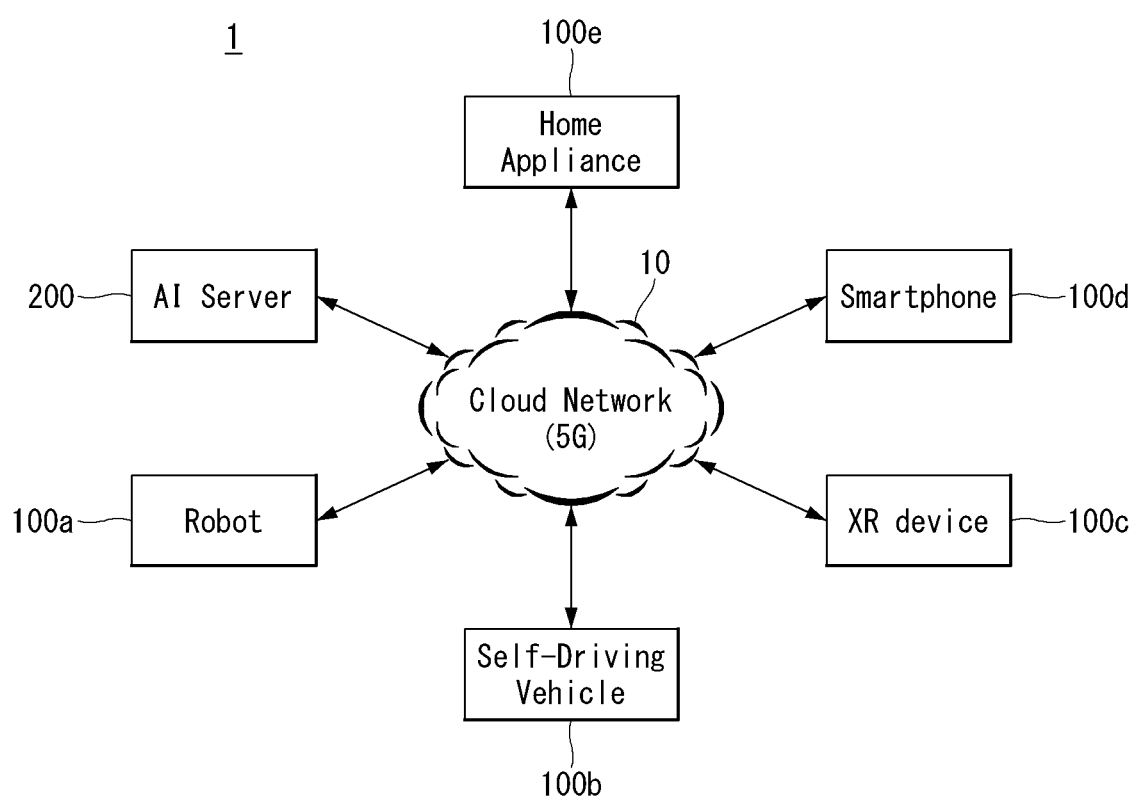
FIG. 3 illustrates an AI system 1 according to an embodiment of the present disclosure.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 3 may be considered to be detailed embodiments of the AI device 100 shown in FIG. 1.

AI+Robot to which the Present Disclosure can be Applied

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI+Self-Driving to which the Present Disclosure can be Applied

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR to which the Present Disclosure can be Applied

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving to which the Present Disclosure can be Applied

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR to which the Present Disclosure can be Applied

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR to which the Present Disclosure can be Applied

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

System General

Figure 4:
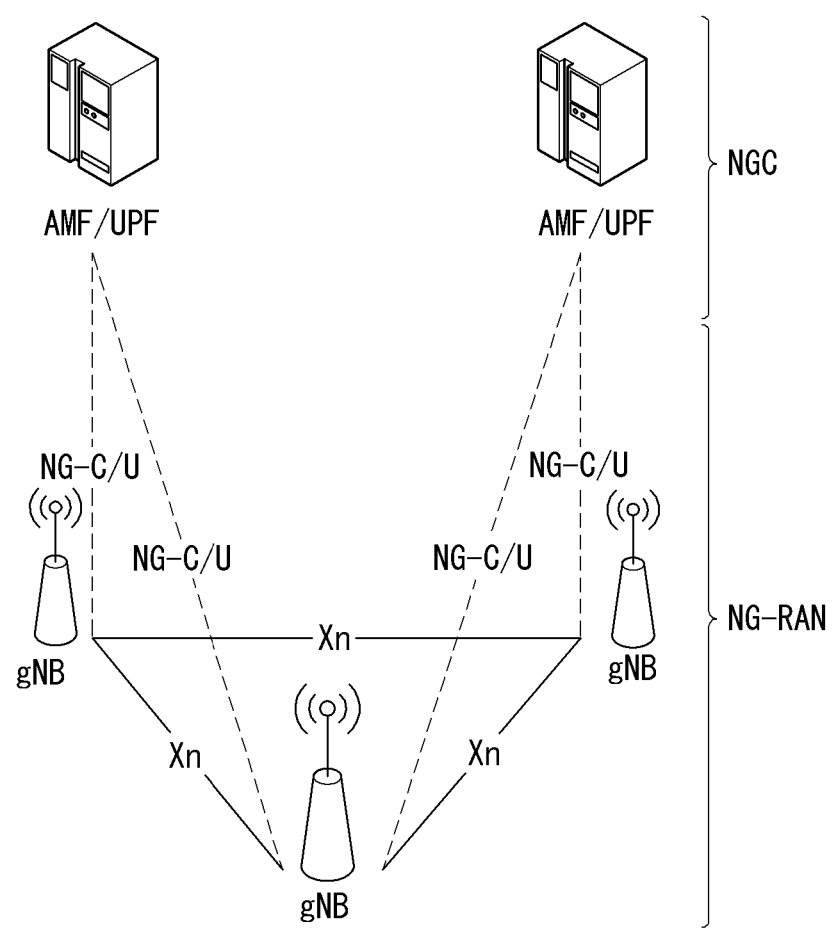
FIG. 4 illustrates an example of an overall structure of a NR system to which a method proposed by the present specification is applicable.

FIG. 4 illustrates an example of an overall structure of a new radio (NR) system to which a method proposed by the present specification is applicable.

Referring to FIG. 4, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$. Downlink and uplink transmissions are organized into radio frames with a duration of $T_f=(\Delta f_{max} N_f/1000) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

Figure 5:
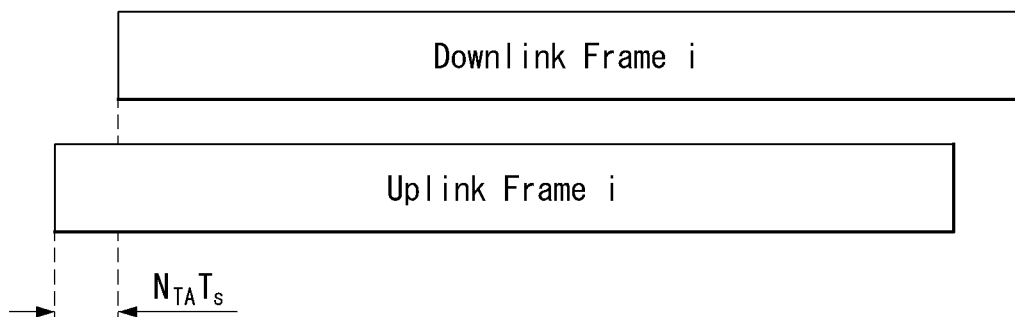
FIG. 5 illustrates a relation between an uplink frame and a downlink frame in a wireless communication system to which a method proposed by the present specification is applicable.

FIG. 5 illustrates a relation between a UL frame and a DL frame in a wireless communication system to which a method proposed by the present disclosure is applicable.

As illustrated in FIG. 5, a UL frame number i for transmission from a user equipment (UE) shall start $T_{TA}=N_{TA}T_s$ before the start of a corresponding downlink frame at the corresponding UE.

Regarding the numerology µ, slots are numbered in increasing order of $n_s^\mu \in \{0, \ldots, N_{subframe}^{slots, \mu}-1\}$ within a subframe, and are numbered in increasing order of $n_{s,f}^\mu \in \{0, \ldots, N_{frame}^{slots, \mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

TABLE 2

| | Slot configuration | | | | | |
|---|---|---|---|---|---|---|
| | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 2220 | 32 | — | — | — |

TABLE 3

| | Slot configuration | | | | | |
|---|---|---|---|---|---|---|
| | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 2220 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Frequency shift, Average received power, and Received Timing.

Figure 6:
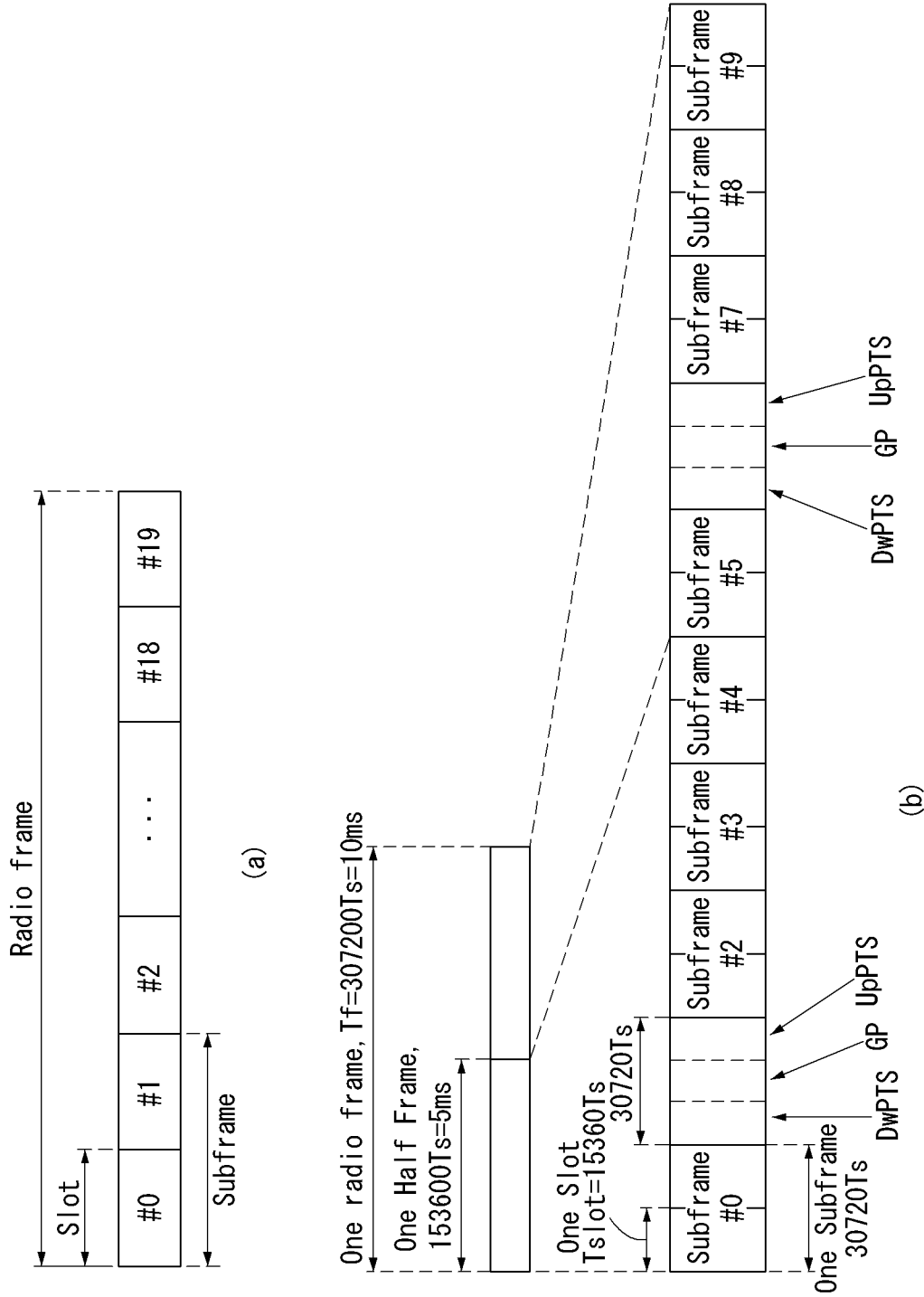
FIG. 6 illustrates an example of a structure of a radio frame in a wireless communication system to which implementations of the present disclosure are applicable.

FIG. 6 illustrates a structure of a radio frame in a wireless communication system to which the present disclosure is applicable.

3GPP LTE/LTE-A supports radio frame structure type 1 applicable to frequency division duplex (FDD) and radio frame structure Type 2 applicable to time division duplex (TDD).

FIG. 6(a) illustrates radio frame structure type 1. A radio frame consists of 10 subframes. One subframe consists of two consecutive slots in the time domain. A time required to transmit one subframe is referred to as a transmission time interval (TTI). For example, the length of one subframe may be 1 ms, and the length of one slot may be 0.5 ms.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive subcarriers in one slot.

FIG. 6(b) illustrates frame structure type 2. The radio frame type 2 consists of two half-frames. Each half-frame consists of 5 subframes, DwPTS (Downlink Pilot Time Slot), guard period (GP), and UpPTS (Uplink Pilot Time Slot), of which one subframe is composed of 2 slots. The DwPTS is used for an initial cell search, synchronization or channel estimation in a UE. The UpPTS is used for channel estimation in a base station and uplink transmission synchronization of the UE. The GP is a period for removing interference generated in uplink due to multi-path delay of a downlink signal between uplink and downlink.

In the frame structure type 2 of a TDD system, uplink-downlink configuration is a rule indicating whether uplink and downlink are allocated (or reserved) to all subframes. Table 4 represents uplink-downlink configuration.

TABLE 4

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 4, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and an uplink pilot time slot (UpPTS). The uplink-downlink configuration may be classified into 7 types, and a location and/or the number of a downlink subframe, a special subframe and an uplink subframe are different for each configuration.

A point of time at which switching from downlink to uplink or switching from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

In all the configurations, subframes 0 and 5 and a DwPTS are reserved for downlink transmission only. An UpPTS and a subframe immediately following the subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

The structure of a radio frame is merely an example, and the number of subcarriers included in a radio frame, the number of slots included in a subframe, and the number of OFDM symbols included in a slot may be variously changed.

Figure 7:
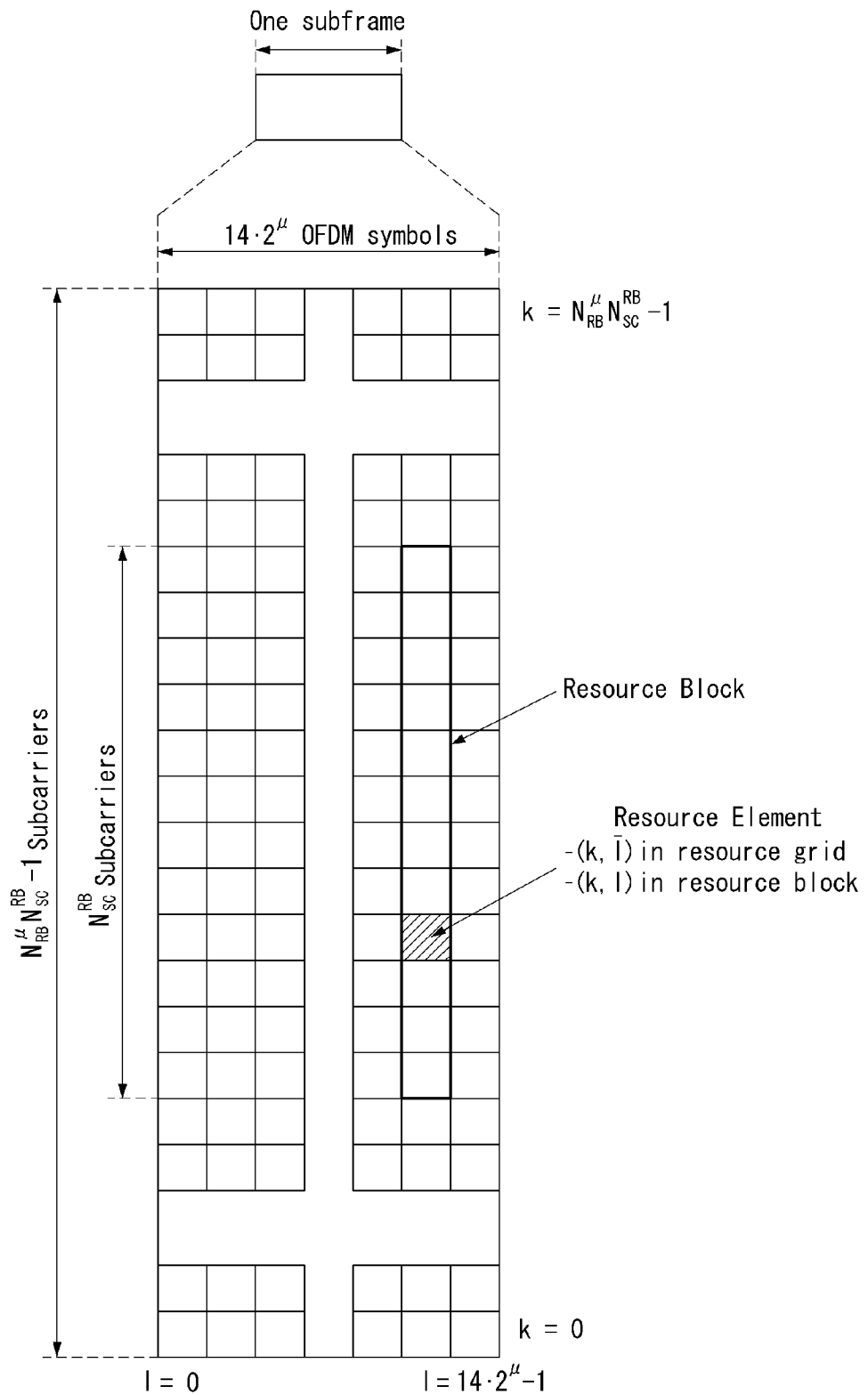
FIG. 7 illustrates an example of a resource grid supported in a wireless communication system to which implementations of the present disclosure are applicable.

FIG. 7 illustrates an example of a resource grid supported in a wireless communication system to which implementations of the present disclosure are applicable.

Referring to FIG. 7, a resource grid consists of $N_{RB}^{\mu} N_{sc}^{RB}$ subcarriers in a frequency domain, each subframe consisting of $14 \cdot 2^{\hat{}} \mu$ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 7, one resource grid may be configured for the numerology μ and an antenna port p.

Each element of the resource grid for the numerology μ and the antenna port p is indicated as a resource element, and may be uniquely identified by an index pair (k,l̄). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Figure 8:
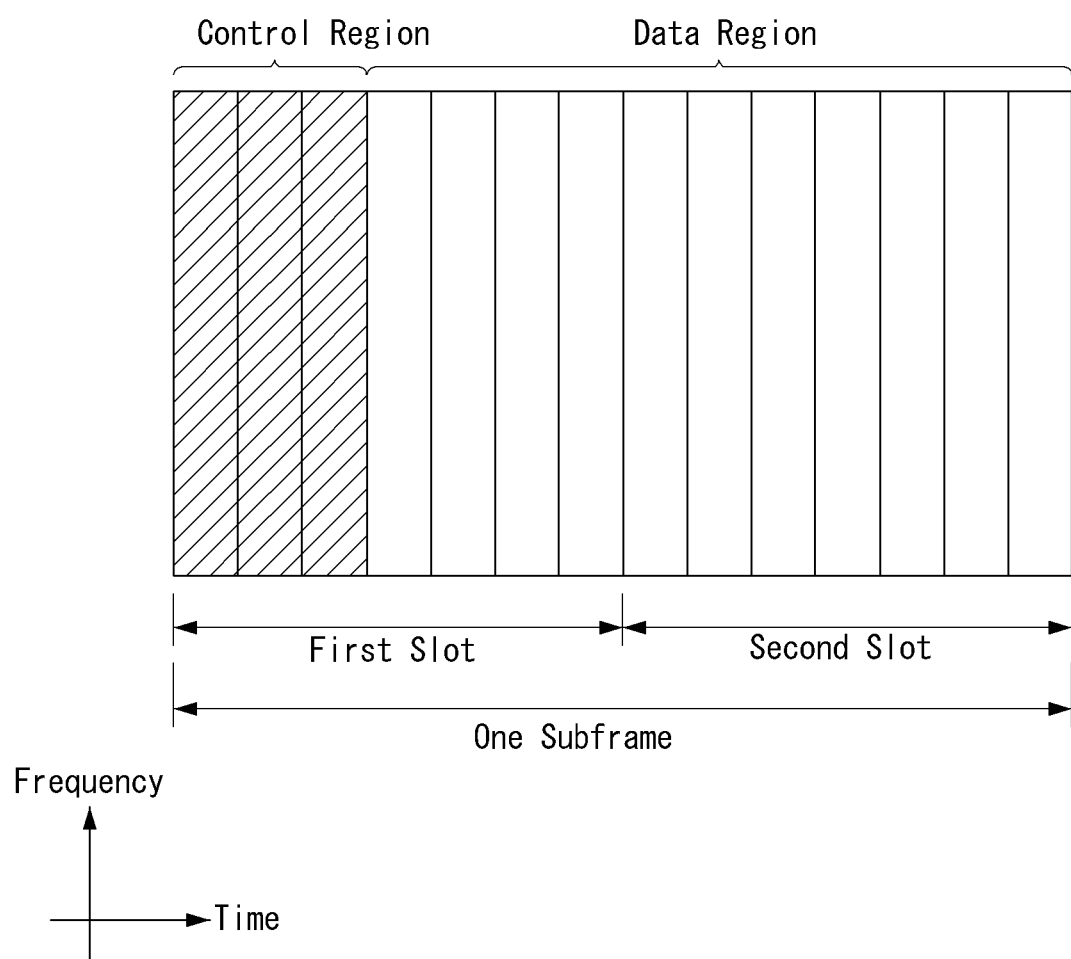
FIG. 8 illustrates an example of a structure of a downlink subframe in a wireless communication system to which implementations of the present disclosure are applicable.

FIG. 8 illustrates a structure of a downlink subframe in the wireless communication system to which the present disclosure is applicable.

Referring to FIG. 8, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked to the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 9:
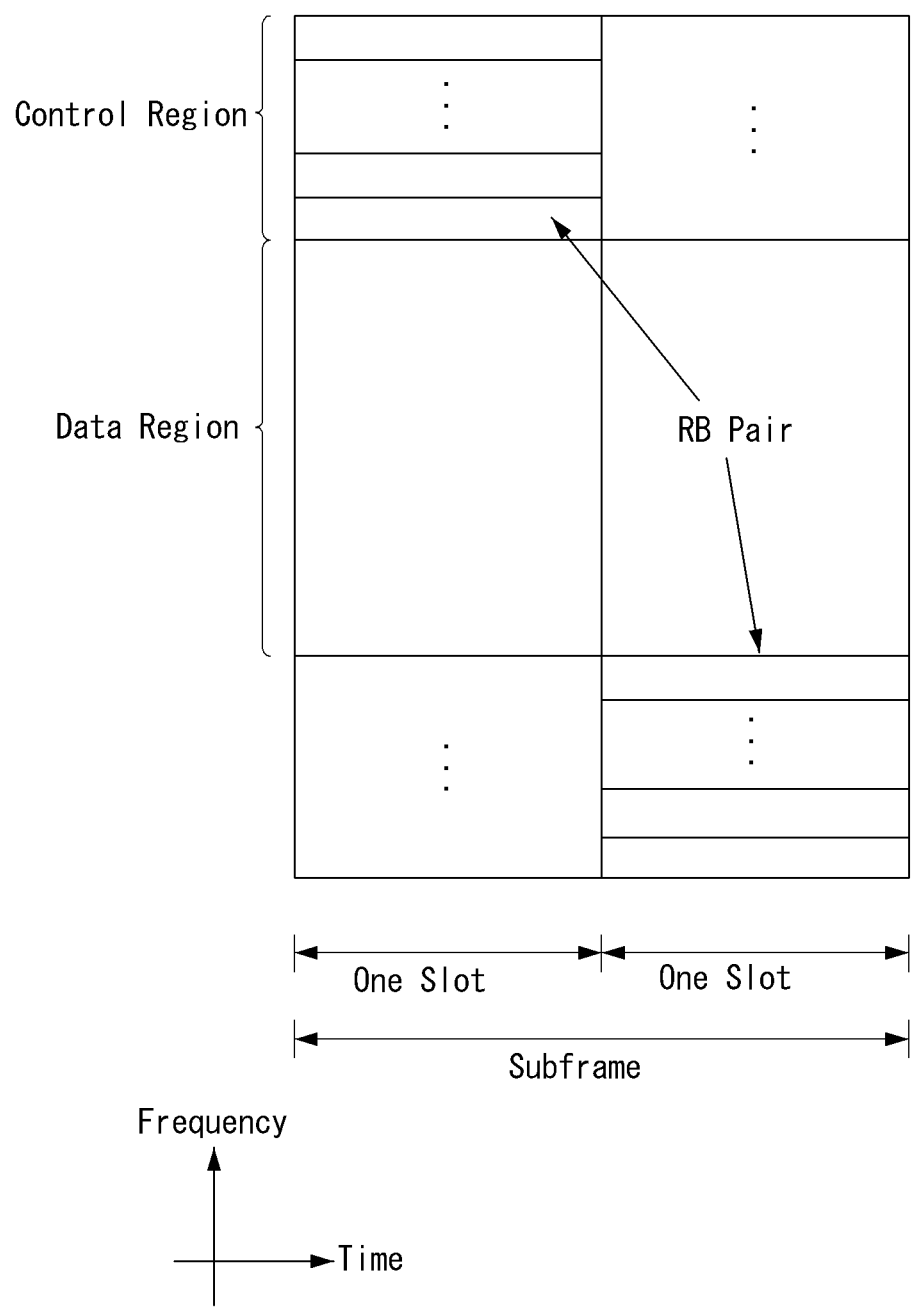
FIG. 9 illustrates an example of a structure of an uplink subframe in a wireless communication system to which implementations of the present disclosure are applicable.

FIG. 9 illustrates a structure of an uplink subframe in the wireless communication system to which the present disclosure is applicable.

Referring to FIG. 9, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Reference Signal (RS)

In a wireless communication system, a signal may be distorted during transmission because data is transmitted through a radio channel. In order for a reception stage to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The above-described signal is called a pilot signal or reference signal (RS).

Furthermore, recently when a packet is transmitted in most of mobile communication systems, a method capable of enhancing transmission and reception data efficiency by adopting a multi-transmission antenna and a multi-reception antenna instead of using one transmission antenna and one reception antenna is used. When data is transmitted and received using multiple input and output antennas, a channel state between the transmission antenna and the reception antenna must be detected in order to receive a signal precisely. Accordingly, each transmission antenna must have an individual reference signal.

In a mobile communication system, an RS may be basically divided into two types depending on its purpose. There are an RS used for channel information acquisition and an RS used for data demodulation. The former must be transmitted in a broadband because it is used for a UE to obtain channel information toward the downlink, and it must be received and measured by even a UE that does not receive downlink data in a specific subframe. Furthermore, the former is also used for measurement, such as handover. The latter is an RS also transmitted in a corresponding resource when a base station transmits downlink, and a UE can perform channel estimation by receiving a corresponding RS and thus can demodulate data. This RS needs to be transmitted in a region in which data is transmitted.

A downlink reference signal includes one common reference signal (CRS) for the information acquisition of a channel state shared by all UEs within a cell and for the measurement of handover and a dedicated reference signal (DRS) used for data demodulation for only a specific UE. Information for demodulation and channel measurement may be provided using such reference signals. That is, a DRS is used for only data demodulation, and a CRS is used for two purposes of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to a transmission side (i.e., an eNB). A CRS is also called a cell-specific RS. In contrast, a reference signal related to the feedback of channel state information (CSI) may be defined as a CSI-RS.

A DRS may be transmitted through resource elements if data on a PDSCH needs to be demodulated. A UE may receive information regarding whether a DRS is present through a higher layer, and a DRS is valid only when a corresponding PDSCH has been mapped. A DRS may also be called a UE-specific RS or demodulation RS (DMRS).

Observed Time Difference of Arrival (OTDOA) Method

Figure 10:
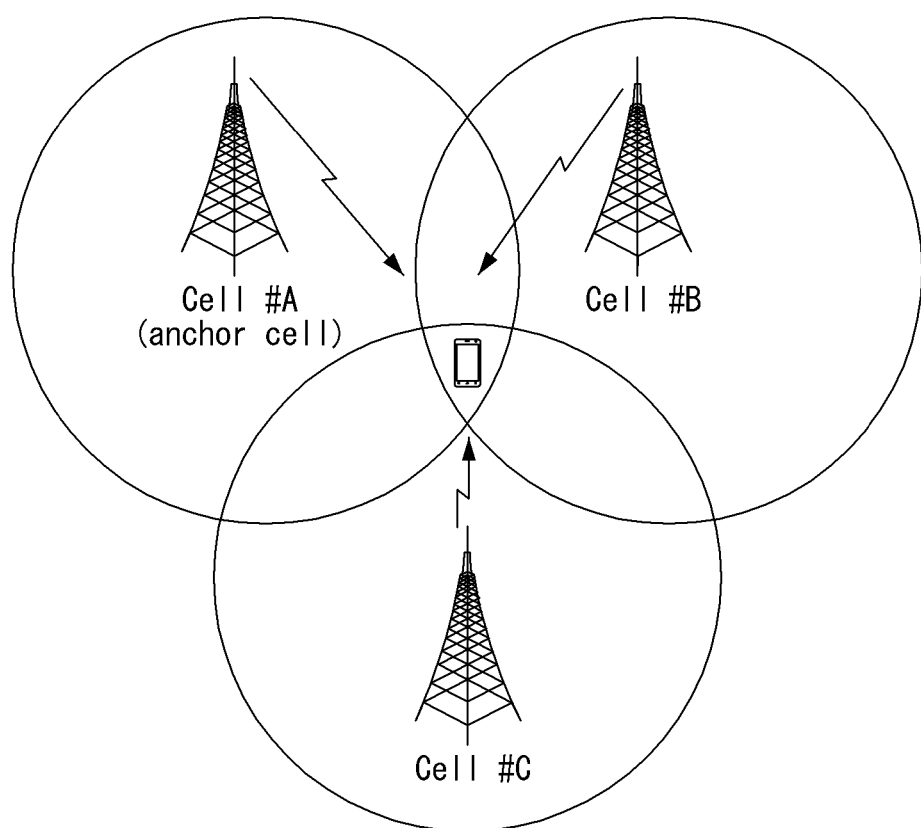
FIG. 10 is a diagram illustrating an OTDOA method for a location determination of a UE.

FIG. 10 is a diagram illustrating an OTDOA method for a location determination of a UE.

Referring to FIG. 10, the UE performs a reference clock based on a subframe transmitted in a current serving cell, so signals received from neighboring cells have different times of arrival (TOAs).

Each of a serving cell and a neighbor cell may be represented as a serving base station or an adjacent base station.

That is, an OTDOA method is to measure, by a UE, the location of the UE using a timing difference taken for a signal, transmitted by each cell, to reach the UE. Since a reference cell is a cell, that is, a criterion for TDOA, the UE measures the time taken to receive a signal from one reference cell using a reference signal or a sync signal received from a plurality of neighbor cells and the delay time of a signal received from each of the plurality of neighbor cells, and reports the time and the delay time to a serving cell or an anchor cell. The serving cell measures the location of the corresponding UE using the reported delay times.

In this case, the reference cell means a cell which may becomes a criterion for a time difference Of arrival (TDOA). A serving cell may correspond to the reference cell, or if a UE performs an operation, such as handover, a serving cell prior to the handover operation may correspond to the reference cell, or a serving cell may not be changed regardless of a handover operation of a UE.

A common reference signal (CRS) or a sync signal (primary synchronization signal/secondary synchronization signal (PSS/SSS)) may be used as a measurement signal for a location determination of a UE, but a positioning reference signal (PRS) for a LoCation service (LCS) may be used as the measurement signal.

A positioning reference (or criterion) signal may also be represented as a location determination reference signal or a location determination pilot signal.

Hereinafter, a PRS is described as an example of a measurement signal used for a location determination of a UE, for convenience of description.

Positioning Reference Signal (PRS)

Hereinafter, a positioning reference signal (hereinafter referred to as a "PRS") is described.

A PRS is a reference signal used for a location determination of a UE, and is transmitted through only a resource block of a downlink subframe determined for PRS transmission.

A PRS sequence is defined by Equation 2.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 2]}$$

$$m = 0, 1, \ldots, 2N_{RB}^{max,DL} - 1$$

In this case, $r_{l,n_s(m)}$ indicates a PRS sequence, $n_s$ indicates a slot number within a frame, and l indicates an OFDM symbol number within a slot. c(i) indicates a pseudo-random sequence, and a pseudo random sequence generator is reset as $c_{int}$ as in Equation 3 at the start point of each OFDM symbol.

$$c_{init}=2^{10} \cdot (7 \cdot (n_s+1)+l+1) \cdot (2 \cdot N_{ID}^{cell}+1)+2 \cdot N_{ID}^{cell}+N_{CP} \quad \text{[Equation 3]}$$

In this case, $N_{ID}^{cell}$ is a physical layer cell ID, and $N_{CP}$ is 1 when an OFDM symbol has a normal cyclic prefix (CP) and 0 when an OFDM symbol has an extended CP.

The APRS sequence ($r_{l,n_s(m)}$) may be mapped to a complex-valued modulation symbols ($a_{k,l}^{(p)}$) used as a reference signal for an antenna port 6(p=6) in a slot ($n_s$) configured for reference signal transmission according to Equation 4 below.

$$a_{k,l}^{(p)} = r_{l,n_s}(m') \quad \text{[Equation 4]}$$

In this case, a resource index pair (k, l) and m, m' values for reference signal transmission may be determined according to Equation 5 or Equation 6 below. In this case, Equation 5 indicates the case of a normal CP, and Equation 6 indicates the case of an extended CP.

$$k = 6(m + N_{RB}^{DL} - N_{RB}^{PRS}) + (6 - l + v_{shift}) \mod 6 \quad \text{[Equation 5]}$$

$$l = \begin{cases} 3, 5, 6 & \text{if } n_s \mod 2 = 0 \\ 1, 2, 3, 5, 6 & \text{if } n_s \mod 2 = 1 \text{ and} \\ & (1 \text{ or } 2PBCH \text{ antenna ports}) \\ 2, 3, 5, 6 & \text{if } n_s \mod 2 = 1 \text{ and} \\ & (4PBCH \text{ antenna ports}) \end{cases}$$

$$m = 0, 1, \ldots, 2 \cdot N_{RB}^{PRS} - 1$$
$$m' = m + N_{RB}^{max,DL} - N_{RB}^{PRS}$$

$$k = 6(m + N_{RB}^{DL} - N_{RB}^{PRS}) + (5 - l + v_{shift}) \mod 6 \quad \text{[Equation 6]}$$

$$l = \begin{cases} 4, 5 & \text{if } n_s \mod 2 = 0 \\ 1, 2, 4, 5 & \text{if } n_s \mod 2 = 1 \text{ and} \\ & (1 \text{ or } 2PBCH \text{ antenna ports}) \\ 2, 4, 5 & \text{if } n_s \mod 2 = 1 \text{ and} \\ & (4PBCH \text{ antenna ports}) \end{cases}$$

$$m = 0, 1, \ldots, 2 \cdot N_{RB}^{PRS} - 1$$
$$m' = m + N_{RB}^{max,DL} - N_{RB}^{PRS}$$

In this case, the bandwidth and number of resource blocks of a reference signal ($N_{RB}^{PRS}$) are configured by a higher layer. Furthermore, the reference signal has a different frequency shift ($v_{shift}$) value for each cell, and such a cell-specific frequency shift is determined according to Equation 7 below.

$$v_{shift}=N_{ID}^{cell} \mod 6 \quad \text{[Equation 7]}$$

If a preamble signal is mapped to a radio resource using such as method, the structure of a preamble transmitted in a specific subframe is illustrated in FIG. 11 to be described later.

FIG. 11 is a diagram illustrating patterns in which PRSs are assigned to resource elements.

FIG. 11 is a diagram illustrating patterns in which PRSs are assigned to resource elements. FIG. 11(a) indicates the case of a normal CP, and FIG. 11(b) indicates the case of an extended CP.

Location Determination Method of UE

Hereinafter, a location determination method of a UE is described.

That is, according to a location determination method of a UE using a PRS, the UE receives assistance data from a serving base station, receives a PRS from a reference cell and neighbor cells using the assistance data, calculates a reference signal time difference (hereinafter referred to as an "RSTD") between the reference cell and the neighbor cells, and transmits the RSTD to the serving base station.

Thereafter, the serving base station transmits the RSTD to a location server. The location server determines the location of the UE using the RSTD.

The RSTD means a relative timing difference between the reference cell and the neighbor cell, and is defined as Equation 8.

$$T_{subframeRxj}-T_{subframeRxi} \quad \text{[Equation 8]}$$

In this case, $T_{subframeRxj}$ is timing at which a UE receives the start point of one subframe from a neighbor cell j, and $T_{subframeRxi}$ is timing at which the UE receives, from a reference cell i, the start point of one subframe closest to the one subframe received from the cell j.

A reference cell and neighbor cells may transmit PRSs at similar timing. If the reference cell and the neighbor cells transmit the PRSs at similar timing, a difference between timing at which a UE receives the PRS from the reference cell and timing at which the UE receives the PRS from each of the plurality of neighbor cells is within a given time range.

For example, a difference between timing at which a UE receives the PRS from the reference cell and timing at which the UE receives the PRS from each of the plurality of neighbor cells may be within one subframe.

In this case, in the definition of an RSTD, assuming that one subframe received by a UE from a neighbor cell j is the first subframe at PRS positioning occasions of the neighbor cell j, one subframe received from a cell i closest to the one subframe received from the cell j becomes the first subframe at PRS positioning occasions of a reference cell i.

In this case, the PRS positioning occasions mean contiguous downlink subframes to which a PRS is assigned. Accordingly, an RSTD becomes a difference between timing at which a PRS is received from the neighbor cell j and timing at which a PRS is received from the reference cell i.

In this case, timing at which a PRS is received from a specific cell is referred to as a time of arrival (hereinafter referred to as "TOA") of the PRS.

Hereinafter, FIG. 12 specifically describes a procedure in which an OTDOA method is performed according to an LTE positioning protocol (LPP) for a location measurement of a UE.

Figure 12:
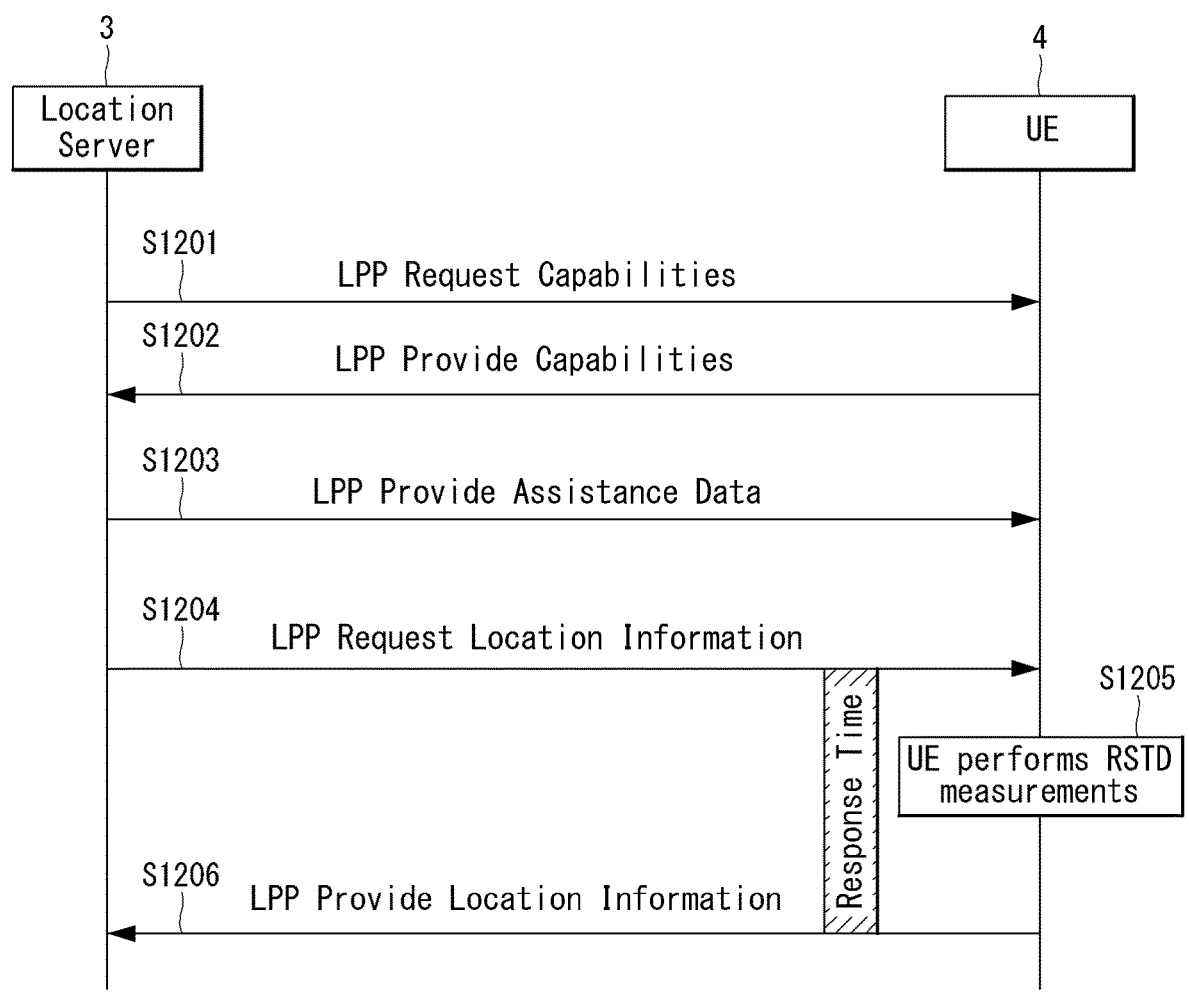
FIG. 12 is a diagram for describing a procedure of performing OTDOA through an LPP.

FIG. 12 is a diagram for describing a procedure of performing OTDOA through an LPP.

Referring to FIG. 12, the LPP is performed as follows.

At S1201, a location server 3 transmits a RequestCapabilities message to a UE 4. The RequestCapabilities message indicates the type of capabilities needed for the UE 4 to perform OTDOA.

At S1202, the UE 4 responds as a ProvideCapabilities message. The ProvideCapabilities message includes OTDOA mode support (reference: LPP supports only a UE-assisted mode 7), a supported frequency band, and an information element, such as RSTD measurement support between frequencies.

At S1203, the location server 3 transmits, to the UE 4, a ProvideAssistanceData message including OTDOA assistance data. The OTDOA assistance data includes data for a reference cell and a maximum of 72 neighbor cells. If the UE 4 supports RSTD measurement between frequencies, neighbor cell support data may be provided with respect to a maximum of three frequency layers.

At S1204, the location server 3 transmits a RequestLocationInformation message UE 4 in order to request RSTD measurement. The RequestLocationInformation message includes information elements, such as a location information type, desired accuracy of location estimate, and a response time.

At S1205, the UE 4 performs RSTD measurement using the ProvideAssistanceData received at S1203. The UE 4 transmits, to the location server 3, a ProvideLocationInformation message including an RSTD based on the response time (S1206). The ProvideLocationInformation message includes the following information elements.

A. Time stamp of the measurement set in form of the System Frame Number

B. Identity of the reference cell used for calculating the RSTD

C. Quality of the TOA measurement from the reference cell

D. Neighboring cell measurement list for up to 24 cells
  1) Identity of the measured neighbour cell
  2) RSTD measurement
  3) Quality of the RSTD measurement A quality indicator for the TOA measurement and RSTD measurement of a reference cell may be a given metric indicative of relative quality of each measurement, for example, a standard deviation, an SNR, etc.

The existing location measurement (localization or positioning) schemes performed as described above shows the best performance based on a distance measured in a line of sight (LoS) environment. However, in many cases, an actual communication environment may not be an LoS environment and may include multiple paths. This is specifically described below with reference FIG. 13.

FIG. 13 is a diagram for describing location measurement based on the identification of a channel characteristic in a situation including multiple paths.

A signal when a signal (ranging signal) for distance measurement is most rapidly received with meaningful power from a reception viewpoint is assumed to be an LoS signal. The existing localization scheme is performed assuming that all ranging signals are LoS signals.

Referring to FIG. 13(*a*), a UE cannot be aware that any ranging signal is an LoS signal although all ranging signals are not LoS signals because multiple paths are present from an anchor node to the UE. Accordingly, if the location server estimates the location of the UE based on an RSTD calculated by the UE, accuracy may be low.

Accordingly, in order to improve the accuracy of location measurement, it is necessary to check a channel characteristic between a UE and a base station (to an anchor node).

The channel characteristic may include at least one of an LoS and a non-line of sight (NLoS).

When it is said that a channel characteristic is the LoS, this means that there is not obstacle in a propagation path because a protruded geographic feature is not present between two points (UE and base station). Accordingly, the LoS means that a free space state can be maintained without an obstacle within a given distance from a straight line in addition to the straight line when the two points are connected by the straight line.

FIG. 13(*b*) illustrates a situation in which a UE identifies a channel characteristic and thus an LoS signal and an NLoS signal are distinguished from each other. Specifically, a total of ranging signals are present, the number of LoS signals among the ranging signals is three, and the number of NLoS signals is three.

As described above, if a UE can identify whether a channel characteristic between the UE and each base station (anchor node) is the LoS, the accuracy of location measurement can be increased using the channel characteristic.

Hereinafter, FIGS. 14 to 18 specifically describe pre-processing procedures capable of improving the accuracy of location measurement by identifying a channel characteristic. Contents changed or added in an LPP procedure are chiefly described in order to help understanding in relation to each embodiment, and a portion identical with or redundant with a previous description is omitted.

FIGS. 14 to 18 are diagrams for describing various embodiments of a pre-processing procedure capable of improving an LPP procedure by applying the present disclosure.

Figure 14:
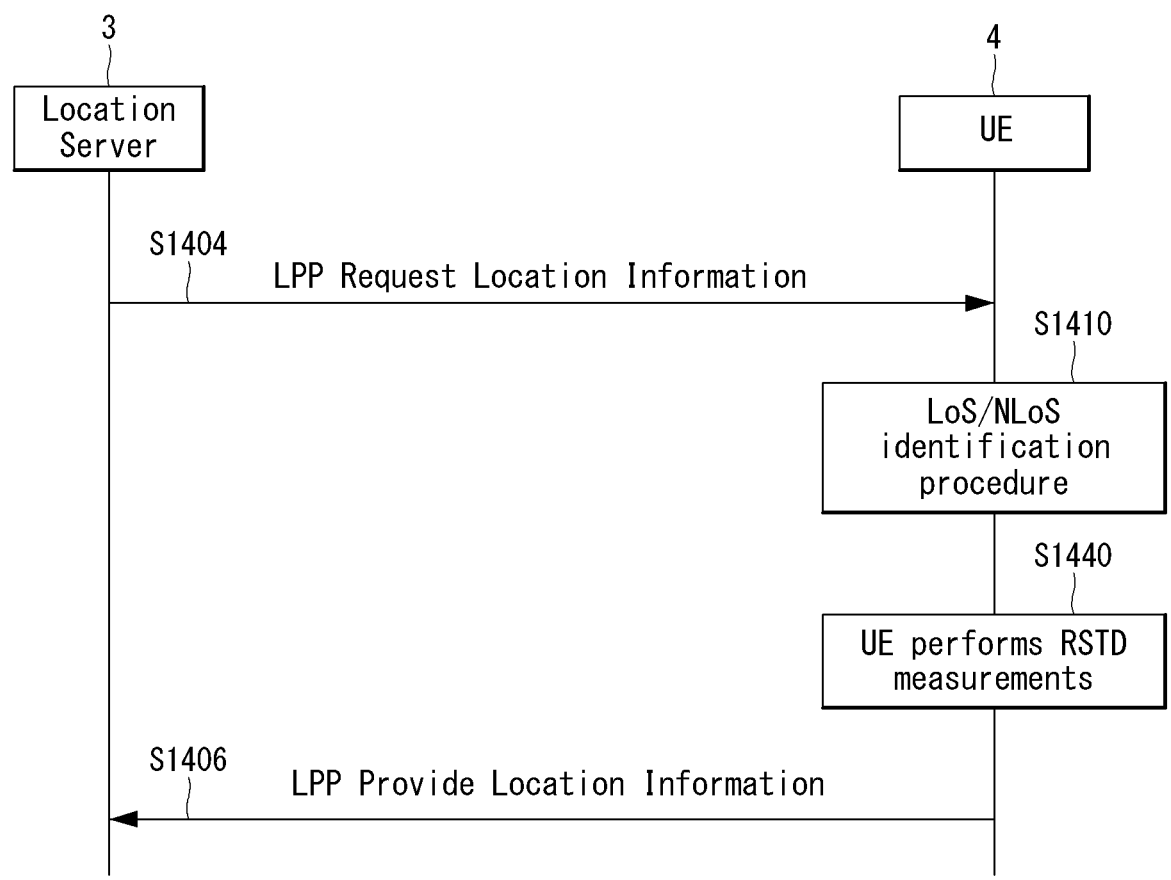
FIGS. 14 to 18 are diagrams for describing various embodiments of a pre-processing procedure capable of improving an LPP procedure by applying the present disclosure.

FIG. 14 illustrates a flowchart in which a procedure (LoS/NLoS identification procedure S1410) is added to an LPP procedure as a pre-processing procedure of identifying a channel characteristic. S1404 and S1406 are the same as S1204 and S1206 of FIG. 12.

[Method 1] LoS-Likelihood Based Localization Scheme

Referring to FIG. 14, the UE 4 calculates LoS-likelihood before performing the existing OTDOA process (S1410). The UE 4 may identify whether a channel characteristic between the UE and each base station is the LoS or the NLoS based on the LoS-likelihood. The UE 4 may calculate an RSTD based on a result of the identification (S1440).

Figure 15:
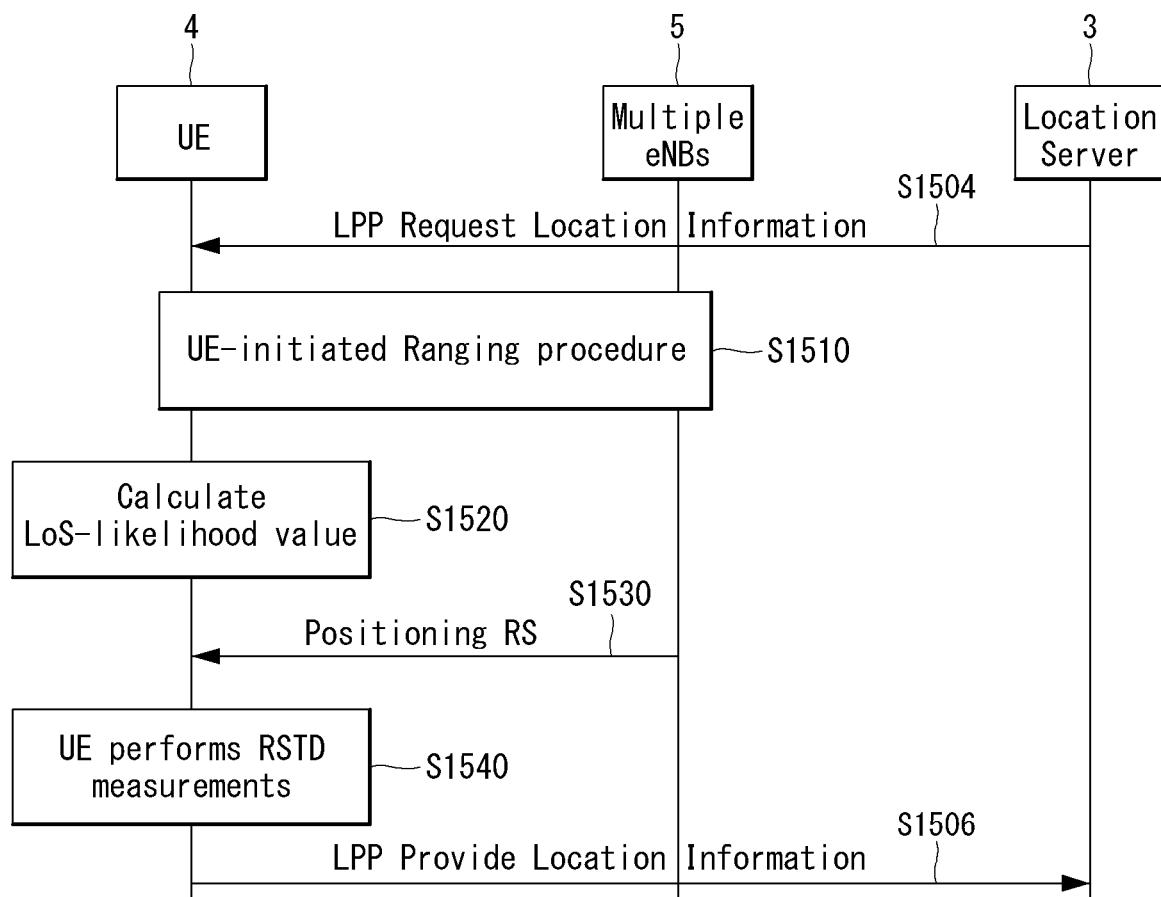

FIG. 15 is a flowchart related to a procedure of including, in a measurement result, LoS-likelihood related to a channel characteristic and reporting the measurement result. S1504 and S1506 are the same as S1204 and S1206 of FIG. 12.

Referring to FIG. 15, at S1510, the UE 4 that has received an LPP request location information message from the location server 3 obtains distance information by performing a ranging procedure along with multiple eNBs 5 configured for location measurement. At S1520, the UE 4 calculates LoS-likelihood for each base station, included in the multiple eNBs 5, based on the distance information obtained by performing the ranging procedure.

At S1530, the UE 4 receives a positioning reference signal (PRS) from the multiple eNBs 5. The UE 4 selects, as a reference cell, an eNB having the highest value of LoS-likelihood among the multiple eNBs 5.

At S1540, the UE 4 calculates an RSTD value based on the selected reference cell.

The UE 4 transmits an LPP Provide Location Information message to the location server 3. In this case, the LPP Provide Location Information message may include the following information.

A. Time stamp of the measurement set in form of the System Frame Number

B. Identity of the reference cell used for calculating the RSTD

C. Quality of the TOA measurement from the reference cell

D. LoS-likelihood value of the reference cell

E. Neighboring cell measurement list for up to 24 cells
  1) Identity of the measured neighbour cell
  2) RSTD measurement
  3) Quality of the RSTD measurement
  4) LoS-likelihood value of the measured neighbour cell The location server 3 may perform an algorithm for location measurement based on the LoS-likelihood included in the LPP Provide Location Information message, that is, a measurement result of the UE 4, so that the accuracy of a location measurement result can be improved.

[Method 1-1] LoS-Likelihood-Based PRS Muting Request Scheme

If a PRS is received from only an eNB whose channel characteristic belongs to the LoS, the accuracy of location measurement according to RSTD calculation will be further improved. Hereinafter, this is specifically described with reference to FIG. 16. S1604 and S1606 of FIG. 16 are the same as S1204 and S1206 of FIG. 12.

The UE 4 may select an eNB that transmits a PRS based on LoS-likelihood. For example, the UE 4 may select a preset number of eNBs in order of high value of LoS-likelihood among the multiple eNBs 5. In this case, when it is said that the value of LoS-likelihood is great, this may mean that a channel characteristic is close to the LoS.

According to an embodiment, the UE may select a preset number of eNBs in order of LoS-likelihood close to a preset value. The preset value may be a rank value of an Euclidean distance matrix (EDM) to be described later when a channel characteristic is the LoS.

Figure 16:
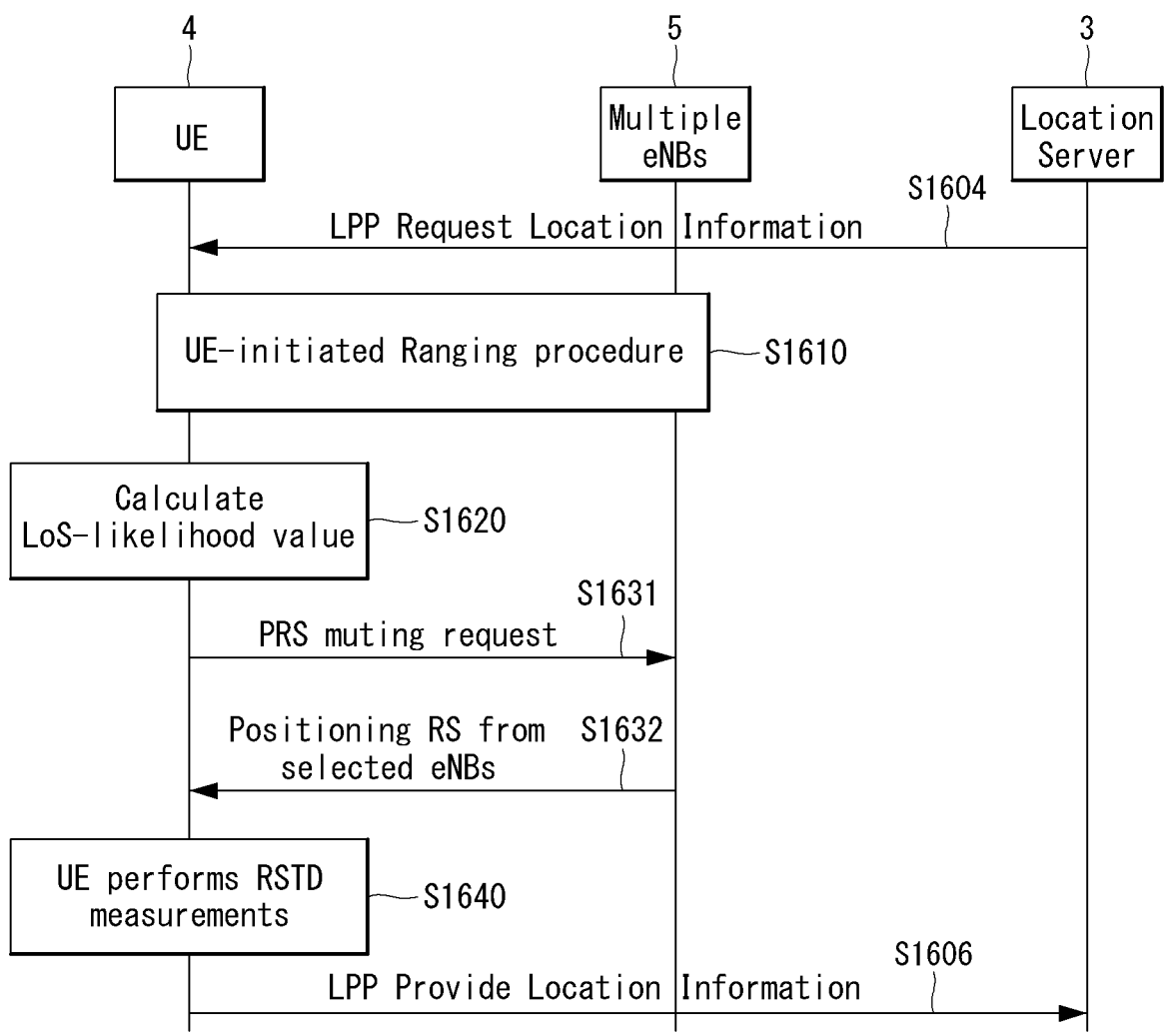

Referring to FIGS. 16, S1610 and S1620 are the same as S1510 and S1620 of FIG. 15, and thus a detailed description thereof is omitted.

The UE 4 obtains distance information according to a ranging procedure and calculates LoS-likelihood based on the distance information (S1610, S1620).

The UE 4 may indicate muting in PRS reception. Specifically, at S1631, the UE 4 transmits a PRS muting request to multiple eNBs 5. The PRS muting request may include information of eNBs selected based on a channel characteristic among the multiple eNBs 5. The PRS muting request indicates PRS muting with respect to the remaining eNBs except the selected eNBs among the multiple eNBs 5.

At S1632, the UE 4 receives a PRS from the selected eNBs. The UE 4 selects, as a reference cell, an eNB having the highest value of LoS-likelihood among the selected eNBs 5.

At S1640, the UE 4 calculates an RSTD value based on the selected reference cell.

As described above, in a limited resource configured for a PRS, a PRS from an eNB whose channel characteristic is the NLoS can be blocked. Accordingly, a gain can be increased.

The PRS muting request may be transmitted through a physical layer signal or a control channel. Alternatively, a PRS muting request may be transmitted to a serving eNB through a higher layer signal (e.g., RRC). The eNB that has received the PRS muting request may transmit the PRS muting request to other eNBs through signaling between the location server 3 or the eNB.

[Method 1-2] LoS-Likelihood-Based PRS Muting Request & Grouping Scheme

Figure 17:
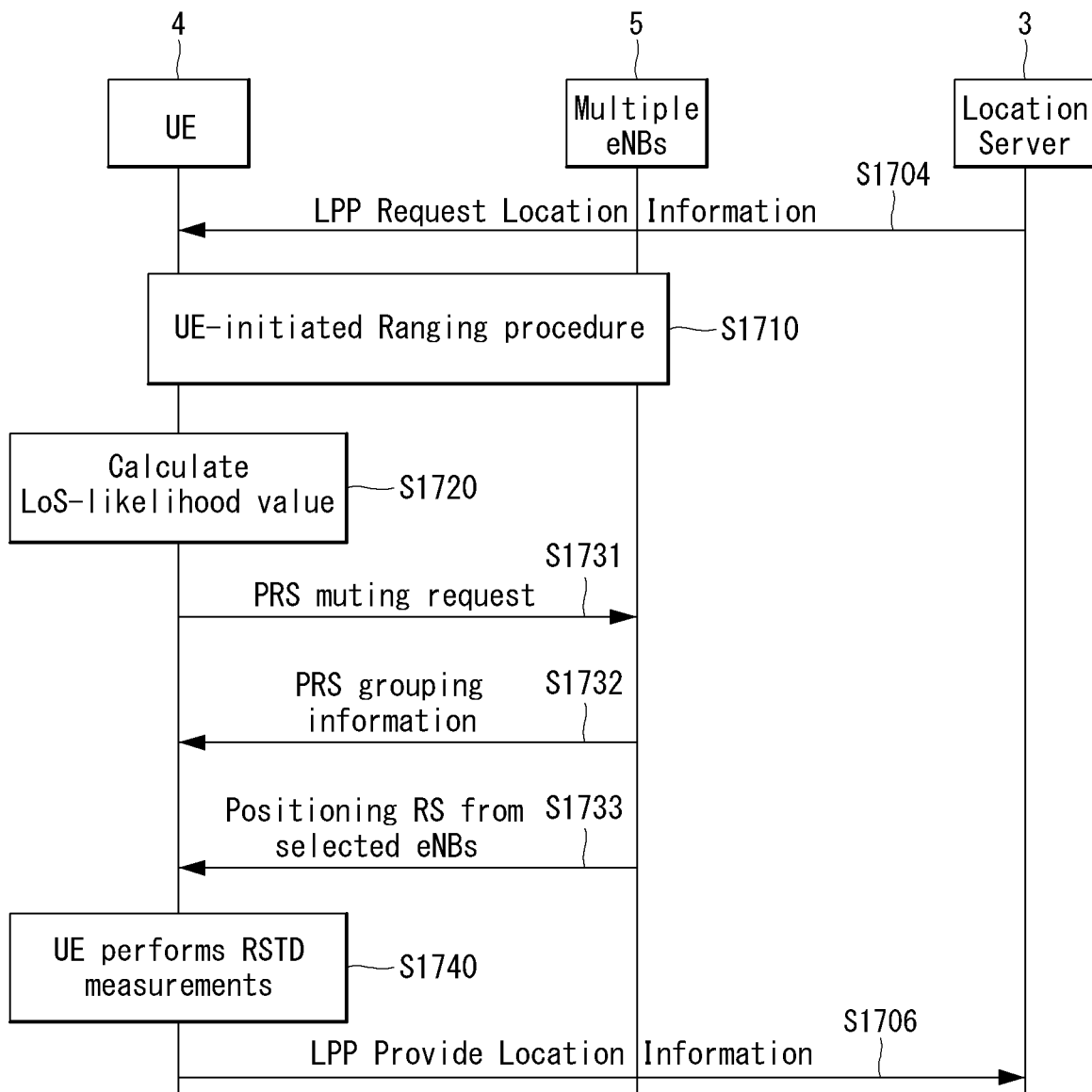

A PRS is broadcasted by each eNB. If multiple UEs perform location measurement procedures, it is necessary to more efficiently receive the PRS in terms of resource utilization. Hereinafter, this is specifically described with reference to FIG. 17. In FIGS. 17, S1704 and S1706 are the same as S1204 and S1206 of FIG. 12.

Each eNB included in the multiple eNBs 5 may transmit a PRS in a subframe in which the PRS is transmitted using at least one scheme of time division multiplexing (TDM), frequency division multiplexing (FDM) and code division multiplexing (CDM) schemes for each group based on a value of LoS-likelihood.

S1710, S1720 and S1740 of FIG. 17 are the same as S1610, S1620 and S1640 of FIG. 16, and thus a redundant description thereof is omitted.

At S1731, the UE 4 may transmit a PRS muting request including LoS-likelihood.

At S1732, any one of the multiple eNBs 5 transmits, to the UE 4, a PRS grouping information message, including information on the resource of a multiplexed PRS, using at least one of the TDM, FDM and CDM schemes to be measured by the corresponding UE.

The PRS grouping information may be transmitted through a physical layer signal or a control channel. Alternatively, the PRS grouping information may be transmitted to the UE through a higher layer signal (e.g., RRC).

The PRS grouping information may be transmitted through a physical layer signal or a control channel. Alternatively, the PRS grouping information may be transmitted to an eNB (serving eNB) through a higher layer signal (e.g., RRC). The eNB that has received the PRS grouping information may transmit the PRS grouping information to other eNBs through signaling between the location server 3 or other eNBs.

At S1733, the UE 4 receives the PRS of the selected eNBs using the PRS grouping information. The UE 4 selects, as a reference cell, an eNB having the highest value of LoS-likelihood among the selected eNBs 5.

As described above, the UE groups can increase their capabilities and more efficiently use limited resources because they transmit only the PRSs of eNBs whose channel characteristic is identified to be the LoS by assigning the PRSs to an orthogonal resource.

[Method 1-3] UE-Initiated Ranging Procedure Method

LoS-likelihood may be obtained by configuring an Euclidean distance matrix (EDM). Hereinafter, a ranging procedure initiated by a UE in order to configure the EDM is described with reference to FIG. 18. S1804 and S1820 of FIG. 18 are the same as S1504 and S1520 of FIG. 15.

Figure 18:
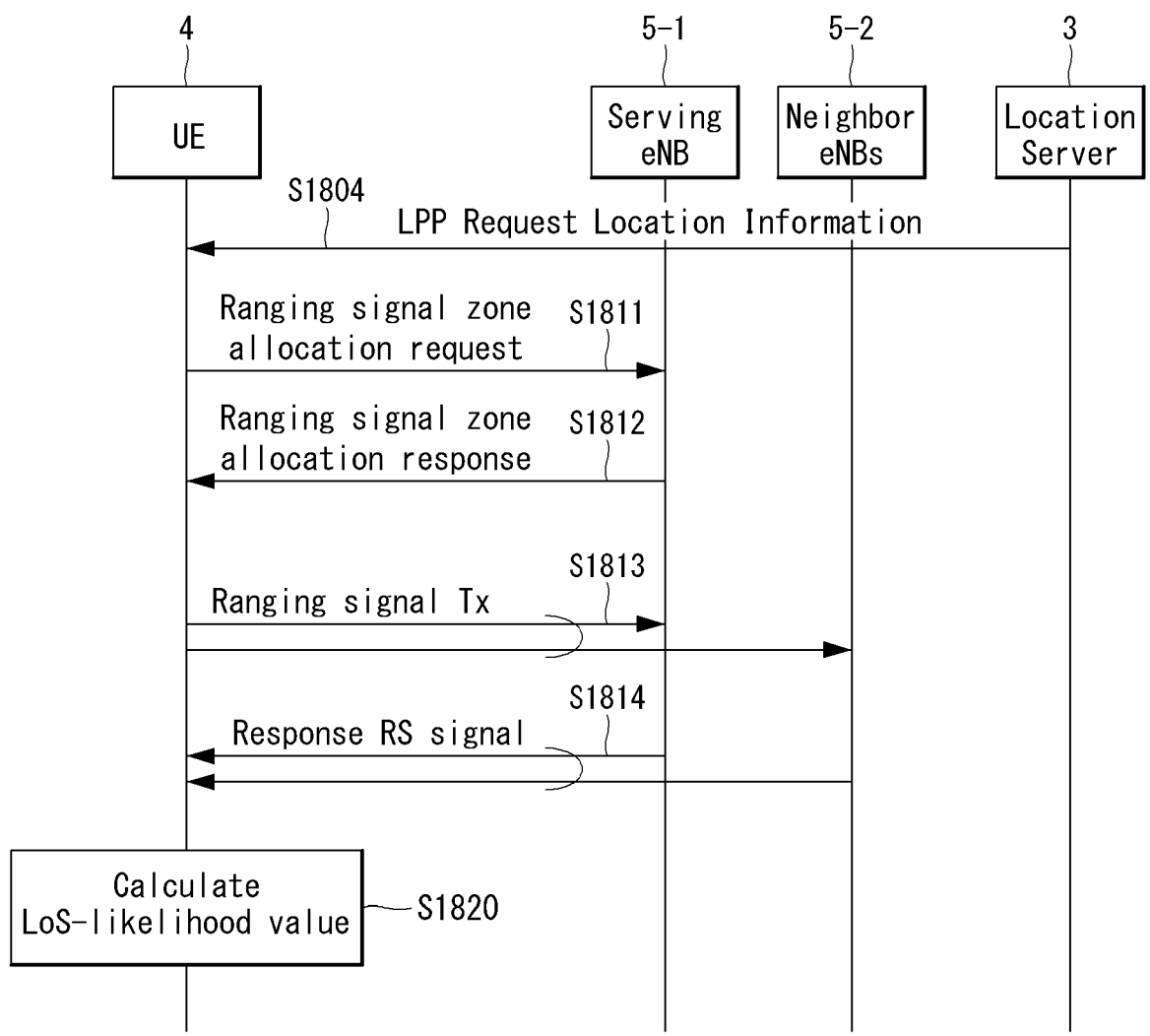

Referring to FIG. 18, at S1811, the UE 4 transmits a ranging procedure request signal (Ranging signal zone allocation request) to at least one serving eNB 5-1 among multiple eNBs.

At S1812, when the serving eNB 5-1 responds by transmitting a ranging procedure response signal (Ranging signal zone allocation response) to the UE 4, a ranging procedure is initiated. The ranging procedure request signal and response signal may be transmitted through a physical layer signal or a control channel or may be transmitted through a higher layer signal.

At S1813, the UE 4 transmits a ranging signal (Ranging signal Tx) to a plurality of serving eNBs 5-1 and 5-2. The UE 4 may obtain distance information between the UE 4 and eNBs, included in the multiple eNBs 5, using a reference signal (Response RS signal) received from each eNB (S1814). The ranging signal (Ranging signal Tx) and the reference signal (Response RS signal) are transmitted to a physical layer signal.

The UE 4 configures the EDM using the obtained distance information.

An example of a channel characteristic (LoS/NLoS) identification using the EDM is specifically described below.

The LoS/NLoS identification may be performed using a low rank characteristic of a double-centered Euclidean distance matrix (EDM).

In the following description, it is assumed that the following definition is established for D, N, H, and Dij.

D: Dimension of Geometric Space

N: # of Nodes

H: Centering Matrix(IN−(1/N)×1N1NT) where 1N=[1 1 1 . . . 1 1] T (size: N-by 1) and IN=N-by-N Identity Matrix Dij: Distance between Node i and Node j As described above, a matrix may be configured by setting each parameter. Each matrix and a corresponding rank property are as follows.

Pairwise Distance Matrix:: R(i,j)=dij:: Full Rank

Euclidean Distance Matrix(EDM)::EDM(i,j)=: dij2: Rank:D+2

Double-centered EDM:: −H×EDM×H/2::Rank: D

According to an embodiment, D, that is, a rank of the double-centered EDM, may be LoS-likelihood indicating a degree that a channel characteristic between a UE and a specific eNB is close to the LoS.

If a corresponding channel characteristic corresponds to the LoS because an obstacle is not present in the propagation path of a straight line that connects the UE and the specific eNB, a rank of the double-centered EDM becomes 2. This means that an Eigenvalue of the double-centered EDM is two (two-dimension).

If the channel characteristic is the NLoS, the rank of the double-centered EDM is another value (e.g., 3) not 2 because the propagation path cannot be represented as the two-dimension.

According to an embodiment, as a value of the LoS-likelihood is close to a preset value, the channel characteristic is close to the LoS. The preset value may be a rank of the double-centered EDM when the channel characteristic is the LoS, and a value of the rank may be 2.

According to an embodiment, a UE may select a preset number of eNBs in order of LoS-likelihood close to the preset value. The preset number may be set as a detailed value by considering the accuracy of location measurement.

LoS-likelihood of a specific eNB may be calculated using one or more eNB groups configured with at least three eNB, including the specific eNB, among multiple eNBs configured for location measurement of a UE.

Specifically, the LoS-likelihood may be an average of ranks of an EDM configured using distance information between each eNB, included in the eNB group, and the UE. The EDM may be a double-centered EDM to which a double centering operation has been applied.

For example, it is assumed that multiple eNBs configured for location measurement of a UE is 4 (#1 to #4) and LoS-likelihood of the eNB #1 is calculated. eNB groups configured with at least three eNBs including the eNB #1, among the multiple eNBs, are as follows.

eNB group 1: eNB #1, eNB #2, eNB #3
eNB group 2: eNB #1, eNB #2, eNB #4
eNB group 3: eNB #1, eNB #3, eNB #4
eNB group 4: eNB #2, eNB #3, eNB #4

Four EDMs may be configured using distance information between a UE and each eNB included in each eNB group (group1, group2, group3, or group4). Costs obtained from the four EDMs are added, and the sum is divided by 3 corresponding to a value, that is, "the number of group −1." Thereafter, the cost of the EDM of a group not including the eNB #1, that is, the group 4, is subtracted. A reciprocal number of a subtraction result becomes LoS-likelihood of the eNB #1. The cost is calculated using a cost function (Cost Function of Hypothesis Test) for LoS/NLoS identification, and will be described later.

Meanwhile, ranging is performed based on Time-of-Flight, and distance resolution (DR) is as follows.

Distance Resolution (DR)=(Speed of light/sampling rate)

In the double-centered EDM, LoS/NLoS between multiple nodes may be identified using a characteristic of an Eigenvalue.

If DR=0, LoS/NLoS may be identified based on whether a (D+1)-th Eigenvalue of the double-centered EDM is present.

However, although all ranging signals have been obtained through a LoS path, if a sampling error occurs, the LoS/NLoS cannot be identified by directly applying a rank condition. In this case, the LoS/NLoS may be identified using Eigenvalues ($\lambda 1, \lambda 2, \lambda 3, \ldots$) of the double-centered EDM.

The cost function (Cost Function of Hypothesis Test) for LoS/NLoS identification is defined as Equation 9 below.

$$\frac{\lambda_{D+1}}{\sqrt{\sum_{k=1}^{D+1} \lambda_k}} \quad \text{[Equation 9]}$$

Equation 9 indicates a degree (distance) that (D+1) Dimension occurs as a ranging error attributable to an NLoS signal. The cost according to Equation 9 may be used to calculate LoS-likelihood.

On an LTE positioning protocol (LPP), assuming that Eigenvalues of a double-centered EDM configured through a pairwise distance between given eNBs and a UE are $\lambda 1, \lambda 2, \lambda 3 \ldots$, The UE may report the following values to an eNB.

1) The index of eNBs configuring the double-centered EDM that minimizes a value $$\frac{\lambda_{D+1}}{\sqrt{\sum_{k=1}^{D+1} \lambda_k}}$$

2) A value $$\frac{\lambda_{D+1}}{\sqrt{\sum_{k=1}^{D+1} \lambda_k}}$$

in this case.

According to an embodiment, the eNBs having the index may be eNBs selected based on a channel characteristic with the UE.

In the embodiments of the present disclosure, the pre-processing procedure according to the OTDOA scheme procedure has been described for convenience of description, but the present disclosure is not limited thereto. The present disclosure may be identically applied to other schemes (UTDOA, E-CID).

The embodiments may be applied a method of reporting a location measurement result, which is performed by a UE in a wireless communication system. This is specifically described with reference to FIGS. 19 to 21.

Figure 19:
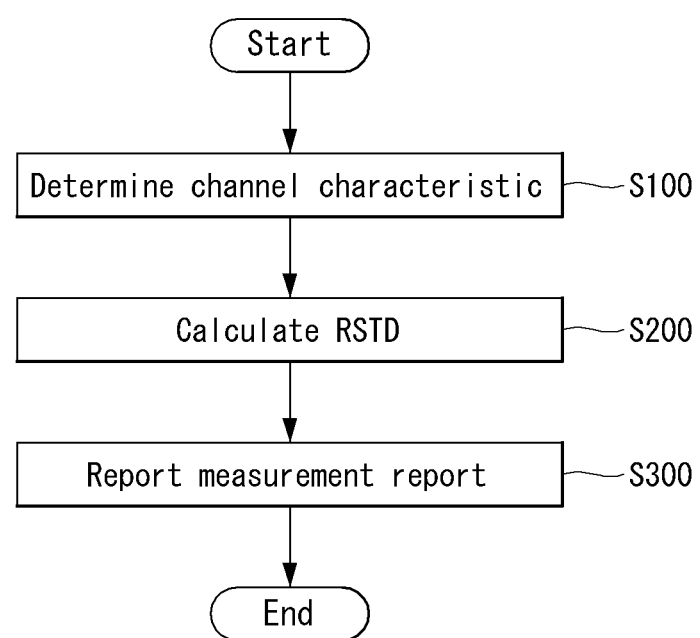
FIG. 19 is a flowchart for describing a method of reporting a measurement result for a location determination according to an embodiment of the present disclosure.

FIG. 19 is a flowchart for describing a method of reporting a measurement result for a location determination according to an embodiment of the present disclosure.

Referring to FIG. 19, a method of reporting, by a UE, a measurement result for a location determination according to an embodiment of the present disclosure may include the step S100 of identifying a channel characteristic, the step S200 of calculating an RSTD, and the step S300 of reporting a measurement result.

At S100, the UE identifies whether a channel characteristic between the UE and each eNB, included in multiple eNBs configured for a location determination of the UE, is a line of sight (LoS).

According to an embodiment, the UE may identify the channel characteristic as the LoS or a non-line of sight (NLoS) using LoS-likelihood calculated based on distance information between the UE and each of the eNBs.

According to an embodiment, the LoS-likelihood may be calculated using a rank of an Euclidean distance matrix (EDM) configured based on the distance information.

Specifically, the EDM may be configured using one or more eNB groups configured to include at least one eNB among the multiple eNBs. Specifically, the UE may configure the EDM using distance information between the UE and each eNB included in the eNB group.

The LoS-likelihood may be a rank of the EDM. As a corresponding value becomes close to a preset value, the UE may identify that a channel characteristic with a corresponding eNB is close to the LoS. The preset value may be a rank value of the EDM when the channel characteristic is the LoS, and the rank value may be 2.

At S200, the UE configures, as a reference cell, any one of eNBs whose channel characteristic is the LoS, and calculates a reference signal time difference (RSTD).

According to an embodiment, the UE may configure, as the reference cell, an eNB having the LoS-likelihood closest to the preset value among the multiple eNBs.

At S300, the UE reports a measurement result including the RSTD.

Specifically, the UE reports the measurement result to the location server. According to an embodiment, the measurement result may include the identity of the reference cell, LoS-likelihood of the reference cell, the identity of each of eNBs whose channel characteristic is the LoS among the multiple eNBs, and at least one piece of information among pieces of information related to LoS-likelihood of each of corresponding eNBs.

As described above, in the present disclosure, whether a channel characteristic between a UE and multiple eNBs configured for location measurement of the UE is a line of sight (LoS) or a non-line of sight (NLoS) is identified. An eNB whose channel characteristic is the LoS among the multiple eNBs is selected as a reference cell, and an RSTD is calculated. Accordingly, the accuracy of location measurement in a situation including multiple paths can be improved.

Figure 22:
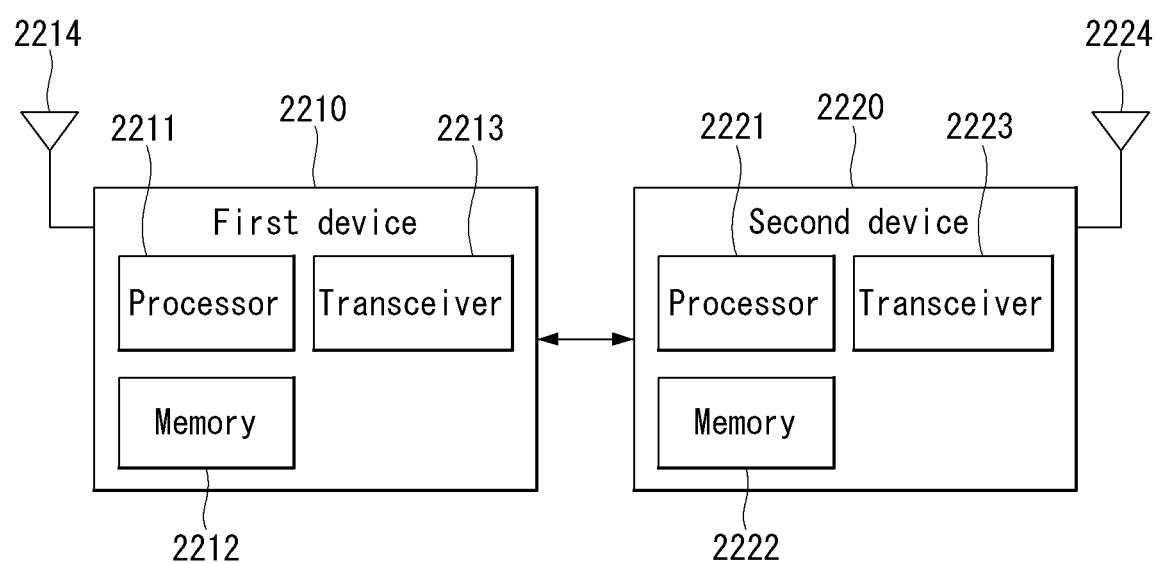
FIG. 22 illustrates a wireless communication device to which methods proposed in the present disclosure may be applied according to another embodiment of the present disclosure.
Figure 23:
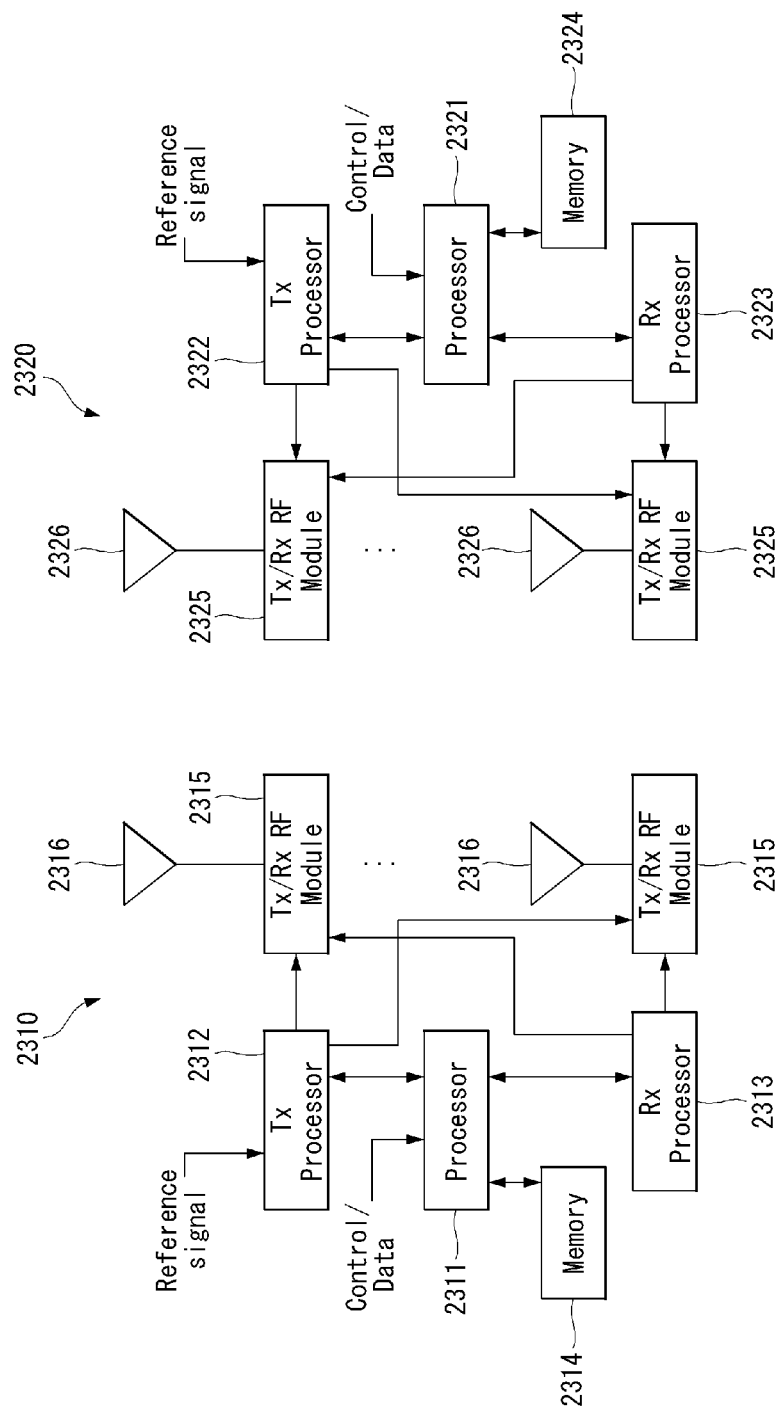
FIG. 23 is another example of a block diagram of a wireless communication device to which methods proposed in the present disclosure may be applied.

In relation to this, in an implementation aspect, the aforementioned operation of the UE may be specifically implemented by a UE device 2220, 2320 illustrated in FIG. 22, FIG. 23 of the present disclosure. For example, the aforementioned operation of the UE may be performed by a processor 2221, 2321 and/or a radio frequency (RF) unit (or module) 2223, 2325.

In a wireless communication, a UE that receives a system data channel (e.g., PDSCH) may include a transmitter for transmitting a radio signal, a receiver for receiving a radio signal, and a processor functionally coupled to the transmitter and the receiver. In this case, the transmitter and the receiver (or transceiver) may be denoted as a transceiver for transmitting and receiving radio signals.

For example, the processor may identify whether a channel characteristic between a UE and each eNB included in multiple eNBs configured for a location determination of the UE is a line of sight (LoS).

The processor configures, as a reference cell, any one of eNBs whose channel characteristic is the LoS, and calculates a reference signal time difference (RSTD). The processor may control the transceiver to report a measurement result including the RSTD.

Hereinafter, step S100 is more specifically described in relation to the calculation of LoS-likelihood with reference to FIG. 20.

Figure 20:
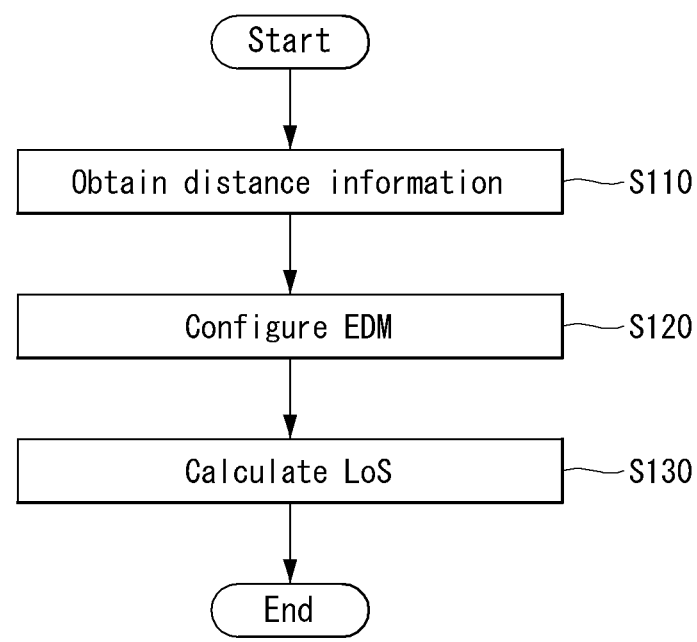
FIG. 20 is a flowchart for specifically describing the step of determining a channel characteristic in a method of reporting a measurement result for a location determination according to an embodiment of the present disclosure.

FIG. 20 is a flowchart for specifically describing the step of identifying a channel characteristic in a method of reporting a measurement result for a location determination according to an embodiment of the present disclosure.

The step of identifying a channel characteristic (S100) according to an embodiment of the present disclosure may include a distance information acquisition step (S110), an EDM configuration step (S120), and an LoS-likelihood calculation step (S130).

At S110, a UE obtains distance information between the UE and each eNB by performing a ranging procedure on the multiple eNBs. Specifically, the UE transmits a ranging procedure request signal (Ranging zone allocation request) to any one (serving eNB) of the multiple eNBs. When the UE receives the ranging procedure response signal (Ranging zone allocation response) from the eNB (serving eNB), a ranging procedure is initiated.

The UE may transmit a ranging signal (Ranging signal Tx) to the multiple eNBs, and may obtain distance information with a corresponding eNB by receiving a reference signal (Response RS signal) from ach eNB included in the multiple eNBs.

At S120, the UE configures an Euclidean distance matrix (EDM) using the obtained distance information.

According to an embodiment, multiple EDMs may be present, and may be generated from an eNB group including at least one eNB among the multiple eNBs. The UE may configure the EDM using distance information between the UE and each eNB included in the eNB group.

According to an embodiment, the EDM may be a double-centered EDM obtained by applying a double centering operation to the Euclidean Distance Matrix (EDM).

At S130, the UE calculates LoS-likelihood using the EDM.

According to an embodiment, the LoS-likelihood may be a rank of the EDM.

According to an embodiment, the LoS-likelihood may be the number of Eigenvalues of the double-centered EDM.

Hereinafter, the step of calculating the RSTD is specifically described in relation to the use of the LoS-likelihood.

The UE may transmit a signal related to a positioning reference signal request (PRS request) to the multiple eNBs according to an LPP procedure, and 를 may calculate the RSTD using a PRS received in response to the signal related to the PRS request.

According to an embodiment, the signal related to the PRS request may include muting information according to the channel characteristic.

According to an embodiment, the signal related to the PRS request may include information on an eNB selected based on the channel characteristic among the multiple eNBs. The muting information may be information indicative of muting for the remaining eNBs except the selected eNBs among the multiple eNBs.

According to an embodiment, the selected eNBs may be a preset number of eNBs selected in order of a value of the LoS-likelihood close to a preset value among the multiple eNBs. The preset number may be set as a detailed value by considering the accuracy of location measurement of the UE.

When receiving the PRS from the LoS-likelihood, the UE may receive PRS grouping information from any one of the multiple eNBs. The UE may calculate an RSTD using the received PRS based on the PRS grouping information. Hereinafter, this is specifically described with reference to FIG. 21.

Figure 21:
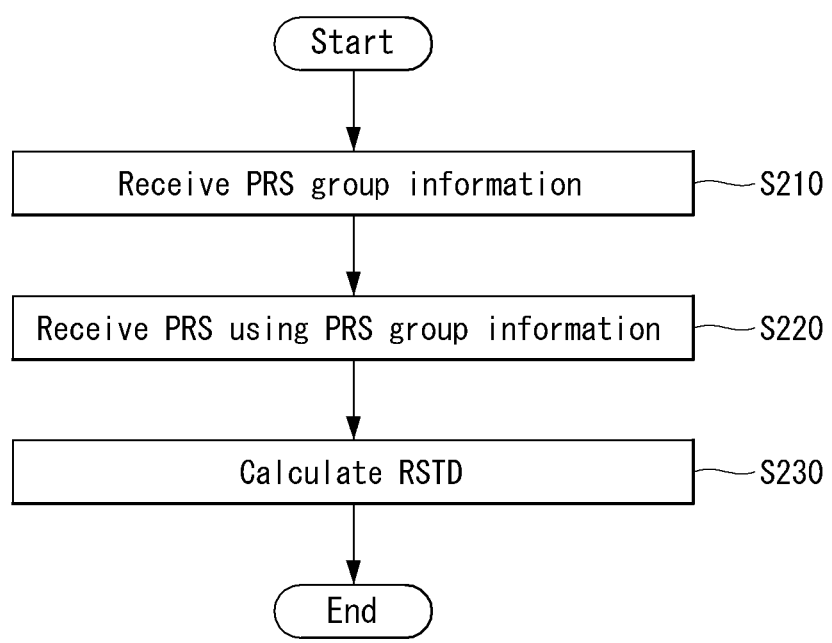
FIG. 21 is a flowchart for specifically describing the step of calculating an RSTD in a method of reporting a measurement result for a location determination according to an embodiment of the present disclosure.

FIG. 21 is a flowchart for specifically describing the step of calculating an RSTD in a method of reporting a measurement result for a location determination according to an embodiment of the present disclosure.

Referring to FIG. 21, the step S200 of calculating an RSTD according to an embodiment of the present disclosure may include a PRS grouping information reception step S210, the step S22 of receiving a PRS using PRS grouping information, and an RSTD calculation step S230.

At S210, the UE receives PRS grouping information from any one of the multiple eNBs.

Specifically, the UE may calculate an RSTD using the PRSs of eNBs selected based on the channel characteristic. The PRSs of the selected eNBs may be mapped to a time-frequency resource region assigned for the PRS of one eNB.

In this case, the UE uses the PRS grouping information in order to receive (to measure) the PRSs of the selected eNBs. The PRS grouping information may include information indicative of a resource element to which the PRS of each eNB included in the selected eNBs has been mapped.

At S220, the UE receives the PRSs of the selected eNBs using the PRS grouping information.

At S230, the UE calculates an RSTD using the PRSs of the selected eNBs.

As described above, the present disclosure calculates an RSTD using the positioning reference signals (PRSs) of selected eNBs based on a channel characteristic, and can further improve the accuracy of location measurement.

Furthermore, the present disclosure includes muting information according to the channel characteristic in transmitting a PRS request signal. The PRS of an eNB whose channel characteristic is the LoS among the multiple eNBs can be received, and the PRSs of eNBs whose channel characteristic is not the LoS among the multiple eNBs can be blocked. Accordingly, a gain in the reception of a PRS can be improved.

Furthermore, in the present disclosure, the PRSs of the selected eNBs are mapped to a time-frequency resource assigned for one PRS based on the channel characteristic, and may be received using PRS grouping information, that is, information indicative of a resource element to which the PRS of each eNB has been mapped. Accordingly, a limited resource configured for PRS transmission can be more efficiently used.

General Device to which the Present Disclosure May be Applied

FIG. 22 illustrates a wireless communication device to which methods proposed in the present disclosure may be applied according to another embodiment of the present disclosure.

Referring to FIG. 22, a wireless communication system includes a first device 2210 and a plurality of second devices 2220 disposed within the area of the base station 2210.

According to an embodiment, the first device 2210 may be a base station, and a second device 2220 may be a UE. Each of the base station and the UE may be represented as a radio device.

The base station 2210 includes a processor 2211, a memory 2212 and a transceiver 2213. The processor 2211 implements the function, process and/or method proposed in FIGS. 1 to 21. The layers of a radio interface protocol may be implemented by the processor. The memory 2212 is connected to the processor, and stores various pieces of information for driving the processor. The transceiver 2213 is connected to the processor, and transmits and/or receives a radio signal. Specifically, the transceiver 2213 may include a transmitter for transmitting a radio signal and a receiver for receiving a radio signal.

The UE 2220 includes a processor 2221, a memory 2222 and a transceiver 2223.

The processor 2221 implements the function, process and/or method proposed in FIGS. 1 to 21. The layers of a radio interface protocol may be implemented by the processor. The memory 2222 is connected to the processor, and stores various pieces of information for driving the processor. The transceiver 2223 is connected to the processor, and transmits and/or receives a radio signal. Specifically, the transceiver 2223 may include a transmitter for transmitting a radio signal and a receiver for receiving a radio signal.

The memory 2212, 2222 may be positioned inside or outside the processor 2211, 2221 and may be connected to the processor 2211, 2221 by various well-known means.

Furthermore, the base station 2210 and/or the UE 2220 may have a single antenna or multiple antennas.

The first device 2210 and the second device 2220 according to another embodiment are described.

The first device 2210 may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 2220 may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 2210 may include at least one processor such as the processor 2211, at least one memory such as the memory 2212, and at least one transceiver such as the transceiver 2213. The processor 2211 may perform the above-described functions, procedures, and/or methods. The processor 2211 may perform one or more protocols. For example, the processor 2211 may perform one or more layers of a radio interface protocol. The memory 2212 is connected to the processor 2211, and may store various forms of information and/or instructions. The transceiver 2213 is connected to the processor 2211, and may be controlled to transmit and receive radio signals.

The second device 2220 may include at least one processor such as a processor 2221, at least one piece of memory device such as memory 2222, and at least one transceiver such as a transceiver 2223. The processor 2221 may perform the above-described functions, procedures and/or methods. The processor 2221 may implement one or more protocols. For example, the processor 2221 may implement one or more layers of a radio interface protocol. The memory 2222 is connected to the processor 2221, and may store various forms of information and/or instructions. The transceiver 2223 is connected to the processor 2221 and may be controlled transmit and receive radio signals.

The memory 2212 and/or the memory 2222 may be connected inside or outside the processor 2211 and/or the processor 2221, respectively, and may be connected to another processor through various technologies, such as a wired or wireless connection.

The first device 2210 and/or the second device 2220 may have one or more antennas. For example, the antenna 2214 and/or the antenna 2224 may be configured to transmit and receive radio signals.

FIG. 23 is another example of a block diagram of a wireless communication device to which the methods proposed in the present disclosure may be applied.

Referring to FIG. 23, a wireless communication system includes a base station 2310 and multiple UEs 2320 disposed within the base station region. The base station may be represented as a transmission device, and the UE may be represented as a reception device, and vice versa. The base station and the UE include processors 2311 and 2321, memories 2314 and 2324, one or more Tx/Rx radio frequency (RF) modules 2315 and 2325, Tx processors 2312 and 2322, Rx processors 2313 and 2323, and antennas 2316 and 2326, respectively. The processor implements the above-described functions, processes and/or methods. More specifically, in DL (communication from the base station to the UE), a higher layer packet from a core network is provided to the processor 2311. The processor implements the function of the L2 layer. In DL, the processor provides the UE 2320 with multiplexing between a logical channel and a transport channel and radio resource allocation, and is responsible for signaling toward the UE. The TX processor 2312 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each of the space streams may be provided to a different antenna 2316 through an individual Tx/Rx module (or transmitter and receiver 2315). Each Tx/Rx module may modulate an RF carrier into each space stream for transmission. In the UE, each Tx/Rx module (or transmitter and receiver 2325) receives a signal through each antenna 2326 of each Tx/Rx module. Each Tx/Rx module restores information modulated in an RF carrier and provides it to the RX processor 2323. The RX processor implements various signal processing functions of the layer 1. The RX processor may perform space processing on information in order to restore a given space stream toward the UE. If multiple space streams are directed toward the UE, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 2321.

UL (communication from the UE to the base station) is processed by the base station 2310 in a manner similar to that described in relation to the receiver function in the UE 2320. Each Tx/Rx module 2325 receives a signal through each antenna 2326. Each Tx/Rx module provides an RF carrier and information to the RX processor 2323. The processor 2321 may be related to the memory 2324 storing a program code and data. The memory may be referred to as a computer-readable medium.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

What is claimed is:

1. A method of reporting, by a terminal, a measurement result for a location determination in a wireless communication system, the method comprising:
   determining whether a channel characteristic between each base station included in a plurality of base stations for the location determination of the terminal and the terminal is a line of sight (LoS) or a non-line of sight (NLoS);
   receiving a Positioning Reference Signal (PRS) from the plurality of base stations;
   configuring, as a reference cell, any one base station among base stations whose channel characteristic is determined to be the LoS and calculating a reference signal time difference (RSTD); and
   reporting the measurement result including the RSTD,
   wherein the channel characteristic is determined as the LoS or the NLoS using a LoS-likelihood calculated based on distance information between the terminal and the each base station,
   wherein the LoS-likelihood is calculated using a rank of a Euclidean distance matrix (EDM) configured based on the distance information,
   wherein the reference cell is determined as a base station having the LoS-likelihood closest to a preset value among the base stations whose channel characteristic is the LoS, and
   wherein the measurement result includes information for at least one of (i) an identity of the reference cell, (ii) LoS-likelihood of the reference cell, (iii) an identity of each of the base stations whose channel characteristic is the LoS, or (iv) LoS-likelihood of each of corresponding base stations.

2. The method of claim 1,
   wherein calculating the RSTD includes:
   transmitting, to the plurality of base stations, a signal related to a positioning reference signal request (PRS request); and
   calculating the RSTD using the PRS, the PRS received based on a signal related to the PRS request,
   wherein the signal related to the PRS request includes muting information according to the channel characteristic.

3. The method of claim 2,
   wherein the signal related to the PRS request includes information on base stations selected based on the channel characteristic, among the plurality of base stations, and
   wherein the muting information is information indicative of muting for remaining base stations except the selected base stations among the plurality of base stations.

4. The method of claim 3,
   wherein the selected base stations are a preset number of base stations selected in a sequence in which a value of the LoS-likelihood is close to a preset value among the plurality of base stations.

5. The method of claim 4,
   wherein calculating the RSTD using the PRS received based on the signal related to the PRS request includes calculating the RSTD using PRSs of the selected base stations, and
   wherein the PRSs of the selected base stations are mapped to a time-frequency resource region assigned for a PRS of one base station.

6. The method of claim 5,
   wherein calculating the RSTD using the PRS received based on the signal related to the PRS request includes:
   receiving PRS grouping information from any one base station among the plurality of base stations; and
   receiving the PRSs of the selected base stations using the PRS grouping information, wherein the PRS grouping information includes information indicative of a resource element to which the PRS of each base station included in the selected base stations has been mapped.

7. A terminal reporting a measurement result for a location determination in a wireless communication system, the terminal comprising:
a transceiver transmitting and receiving radio signals;
a memory; and
a processor coupled to the transceiver and the memory,
wherein the memory stores instructions that, when executed by the processor, configure the processor to perform operations comprising:
determining whether a channel characteristic between each base station included in a plurality of base stations configured for the location determination of the terminal and the terminal is a line of sight (LoS) or a non-line of sight (NLoS);
receiving a Positioning Reference Signal (PRS) from the plurality of base stations
configuring, as a reference cell, any one base station among base stations whose channel characteristic is determined to be the LoS and calculate a reference signal time difference (RSTD); and
reporting the measurement result including the RSTD,
wherein the channel characteristic is determined as the LoS or the NLoS using a LoS-likelihood calculated based on distance information between the terminal and the each base station,
wherein the LoS-likelihood is calculated using a rank of a Euclidean distance matrix (EDM) configured based on the distance information,
wherein the reference cell is determined as a base station having the LoS-likelihood closest to a preset value among the base stations whose channel characteristic is the LoS, and
wherein the measurement result includes information for at least one of (i) an identity of the reference cell, (ii) LoS-likelihood of the reference cell, (iii) an identity of each of the base stations whose channel characteristic is the LoS, or (iv) LoS-likelihood of each of corresponding base stations.

8. The terminal of claim 7,
wherein the processor is configured to transmit, to the plurality of base stations, a signal related to a positioning reference signal request (PRS request) and to calculate the RSTD using a received PRS based on a signal related to the PRS request, and
wherein the signal related to the PRS request includes muting information according to the channel characteristic.

9. The terminal of claim 8,
wherein the signal related to the PRS request includes information on base stations selected based on the channel characteristic, among the plurality of base stations, and
wherein the muting information is information indicative of muting for remaining base stations except the selected base stations among the plurality of base stations.

10. An apparatus reporting a measurement result for a location determination of a terminal in a wireless communication system, the apparatus comprising:
a memory and a processor coupled to the memory,
wherein the memory stores instructions that, when executed by the processor, configure the processor to perform operations comprising:
determining whether a channel characteristic between each base station included in a plurality of base stations for the location determination of the terminal and the terminal is a line of sight (LoS) or a non-line of sight (NLoS);
receiving a Positioning Reference Signal (PRS) from the plurality of base stations;
configuring, as a reference cell, any one base station among base stations whose channel characteristic is determined to be the LoS and calculate a reference signal time difference (RSTD); and
reporting the measurement result including the RSTD,
wherein the channel characteristic is determined as the LoS or the NLoS using a LoS-likelihood calculated based on distance information between the terminal and the each base station,
wherein the LoS-likelihood is calculated using a rank of a Euclidean distance matrix (EDM) configured based on the distance information,
wherein the reference cell is determined as a base station having the LoS-likelihood closest to a preset value among the base stations whose channel characteristic is the LoS, and
wherein the measurement result includes information for at least one of (i) an identity of the reference cell, (ii) LoS-likelihood of the reference cell, (iii) an identity of each of the base stations whose channel characteristic is the LoS, or (iv) LoS-likelihood of each of corresponding base stations.

* * * * *